(12) United States Patent
Nagareda et al.

(10) Patent No.: US 11,703,581 B2
(45) Date of Patent: Jul. 18, 2023

(54) ULTRASONIC TRANSDUCER FOR A MEASURING DEVICE

(71) Applicant: HONDA ELECTRONICS CO., LTD., Aichi (JP)

(72) Inventors: Kenji Nagareda, Aichi (JP); Shigeo Yamamoto, Aichi (JP)

(73) Assignee: HONDA ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 17/607,111

(22) PCT Filed: Apr. 14, 2020

(86) PCT No.: PCT/JP2020/016369
§ 371 (c)(1),
(2) Date: Oct. 28, 2021

(87) PCT Pub. No.: WO2021/210055
PCT Pub. Date: Oct. 21, 2021

(65) Prior Publication Data
US 2023/0037018 A1    Feb. 2, 2023

(51) Int. Cl.
*G01S 7/521* (2006.01)
*B06B 3/00* (2006.01)
(Continued)

(52) U.S. Cl.
CPC ............... *G01S 7/521* (2013.01); *B06B 3/00* (2013.01); *G01S 15/96* (2013.01); *H04R 17/00* (2013.01)

(58) Field of Classification Search
CPC .......... G01S 7/521; G01S 15/96; B06B 3/00; H04R 17/00
See application file for complete search history.

(56) References Cited

U.S. PATENT DOCUMENTS 4,640,291 A * 2/1987 't Hoen ............... G01S 15/8925
600/459
5,434,827 A * 7/1995 Bolorforosh ........... G10K 11/02
600/459
(Continued)

FOREIGN PATENT DOCUMENTS

JP        50-99879       8/1975
JP        56-137798      10/1981
(Continued)

*Primary Examiner* — Ian J Lobo
(74) *Attorney, Agent, or Firm* — Clark & Brody LP

(57) ABSTRACT

The object of this invention is to provide an ultrasonic transducer for a measuring device capable of widening a frequency band suitable for transmitting and receiving ultrasonic waves while reducing the manufacturing cost. The ultrasonic transducer for a measuring device includes a substantially disc-shaped base material that serves too as an acoustic-matching layer and substantially disc-shaped piezoelectric element that is joined to the base material. The piezoelectric element is formed with grooves extending in the planar direction so that they do not cross one another, and the plurality of strip-shaped vibration units are arranged through the grooves. The length of the vibration unit becomes shorter as the distance from the center of the piezoelectric element increases. Then, the piezoelectric element vibrates in the thickness direction in the first-frequency band and vibrates in the radial direction in the second-frequency band, which is lower than the first-frequency band.

9 Claims, 12 Drawing Sheets

(51) Int. Cl.
    *G01S 15/96*    (2006.01)
    *H04R 17/00*    (2006.01)

(56)            References Cited

U.S. PATENT DOCUMENTS 6,776,051 B2 *   8/2004   Suzuki ................... G01F 1/662
                                                           73/861.27
    6,788,620 B2 *   9/2004   Shiraishi ............... G10K 11/02
                                                            310/334
    2005/0201205 A1 *  9/2005   Chavez ................. G10K 11/02
                                                            367/152
    2005/0236932 A1 * 10/2005   Nagahara ............... G01F 1/662
                                                            310/334

FOREIGN PATENT DOCUMENTS

JP          4-119800        4/1992
    JP          9-149495        6/1997
    JP          2008-212453     9/2008
    JP          2008-544262    12/2008
    JP          2011-155611     8/2011
    WO            91/15090     10/1991
    WO     WO-2020017511 A1 *   1/2020  ........... B06B 1/0651

* cited by examiner

FIG. 10
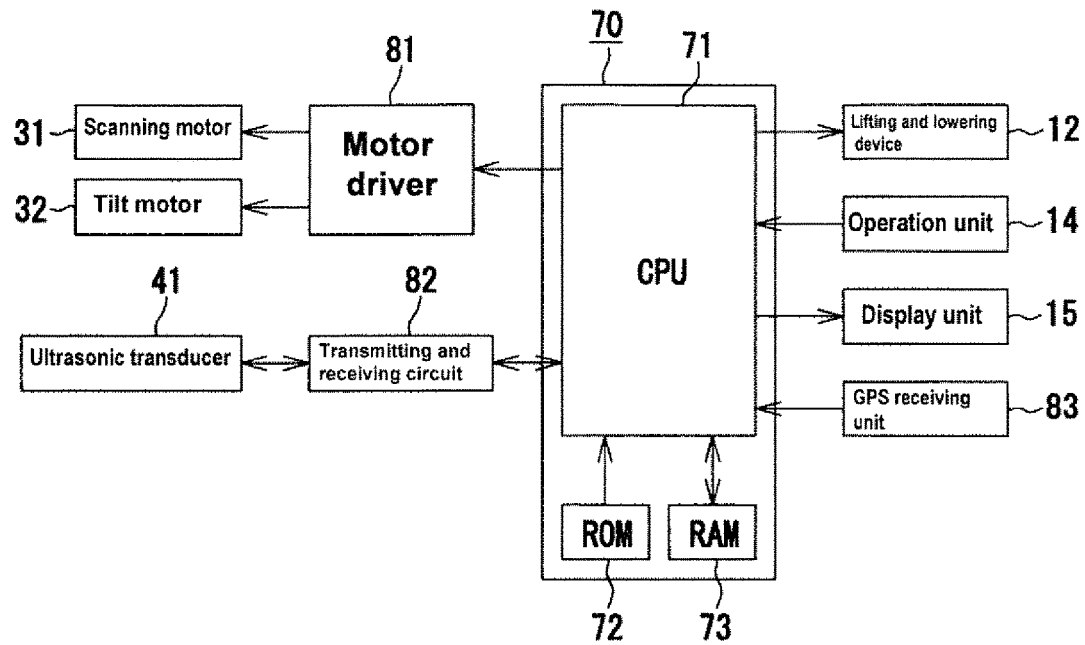
FIG. 11 (a) State of being extended     FIG. 11 (b) State of being contracted
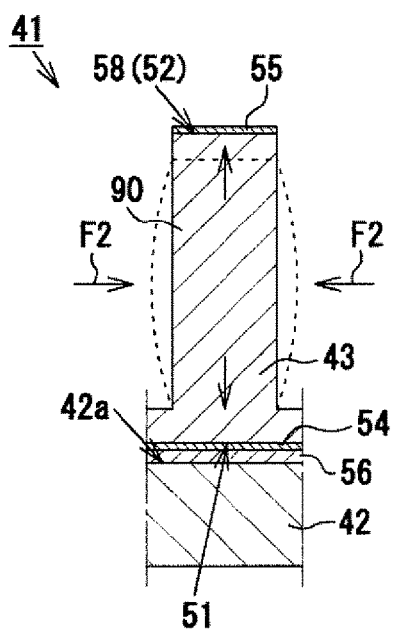
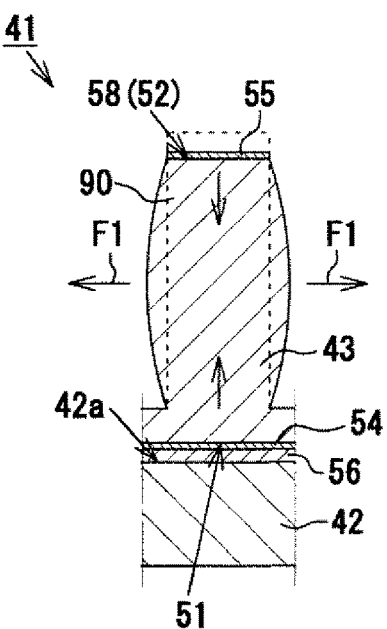

FIG. 12
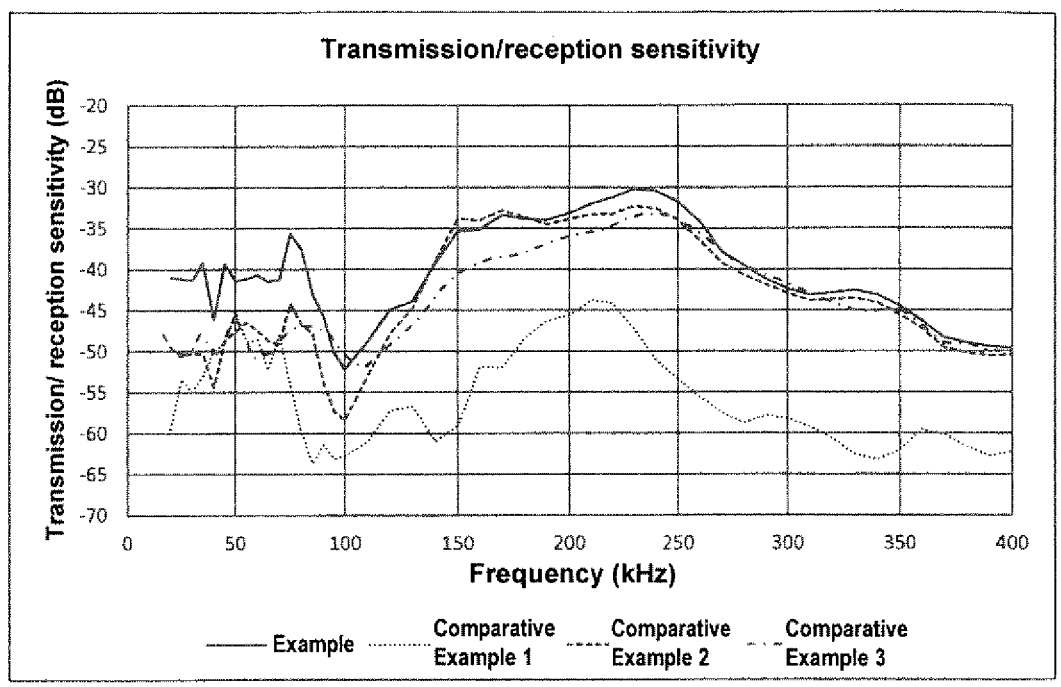
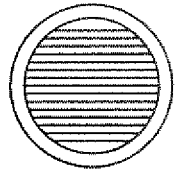
<Example>
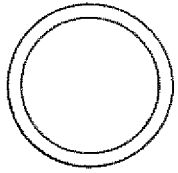
<Comparative Example 1>
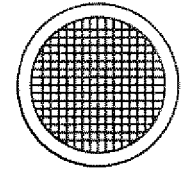
<Comparative Example 2>
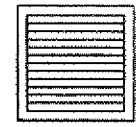
<Comparative Example 3>

ULTRASONIC TRANSDUCER FOR A MEASURING DEVICE

TECHNICAL FIELD

The present invention relates to an ultrasonic transducer for a measuring device, which transmits and receives ultrasonic waves.

TECHNICAL BACKGROUND

Conventionally, a sonar device that detects a target object such as a school of fish by transmitting and receiving ultrasonic waves has been known. A sonar device is a measuring device with an ultrasonic transducer that transmits and receives ultrasonic waves and has a mechanism that causes an ultrasonic transducer to perform a swirling motion centered on a rotation axis oriented in the vertical direction and also to perform a tilting motion centered on a tilted axis orthogonal to the rotation axis. As such, it is possible to detect something underwater by transmitting and receiving ultrasonic waves while actuating the ultrasonic transducer. Then, the result of the underwater detection is displayed on a screen as the detected image. The ultrasonic transducer generally includes an acoustic-matching layer and a piezoelectric element joined to the acoustic-matching layer.

By the way, a disc-shaped piezoelectric element is used in the ultrasonic transducer for the sonar device, and the frequency band of the ultrasonic waves is narrow. In recent years, as the number of ships equipped with similar sonar has increased, channel interference with other ships is likely to occur. To avoid such interference, it is sufficient to transmit and receive ultrasonic waves by removing the drive-frequency used by nearby ships. However, in the case that the frequency band is narrow, there are few choices of frequencies that can be changed, thus requiring the use of an ultrasonic transducer having a wide frequency band of ultrasonic waves.

As a method for broadening the ultrasonic waves, it is suggested, as shown in FIGS. 15 and 16, that the piezoelectric element 102 constituting the ultrasonic transducer 101 be made by a plurality (e.g. 100 pieces or more) of vibration units 103 that are arranged vertically and horizontally when viewed from the thickness direction (see e.g. Patent Documents 1 to 6). In this way, each of the vibration units 103 is easily deformed in the height direction of the vibration unit 103, so that the piezoelectric element 102 is easily deformed at each portion. As a result, the piezoelectric element 102 easily vibrates, so that the electromechanical-coupling coefficient of ultrasonic waves becomes high, thus making the frequency band wider.

PRIOR ARTS

Patent Documents

Patent Document 1: Japanese Unexamined Utility Model Application Publication No. S50-99879 (FIG. 1, FIG. 2 or the like).
Patent Document 2: Japanese Unexamined Patent Application Publication No. H4-119800 (FIGS. 1 to 4 or the like).
Patent Document 3: WO91/15090 (FIGS. 2, 3 or the like).
Patent Document 4: Japanese Unexamined Patent Application Publication No. 2008-212453 (FIG. 2 or the like).
Patent Document 5: Japanese Unexamined Patent Application Publication No. (Translation of PCT Application) 2008.544262 (FIGS. 1, FIG. 2 or the like).
Patent Document 6: Japanese Unexamined Patent Application Publication No. 2011-155611 (FIG. 4 or the like).

DISCLOSURE OF THE INVENTION

Problems to be Solved by the Invention

However, in the prior art, as described in Patent Documents 1 to 6, since the columnar-vibration unit 103 is obtained by forming grooves extending vertically and horizontally, it is required to form many grooves to obtain all of the vibration units 103. In this case, it is more difficult to make grooves, thus causing the problem of increasing the manufacturing cost of the ultrasonic transducer 101.

The present invention has been made in light of the above problems, and its object is to provide an ultrasonic transducer for a measuring device capable of widening the frequency band suitable for transmitting and receiving ultrasonic waves while keeping the cost of manufacturing low.

Means of Solving the Problems

To solve the above problems, the first aspect of this invention refers to an ultrasonic transducer for a measuring device, which transmits and receives ultrasonic waves, characterized in that the ultrasonic transducer includes a substantially disc-shaped base material that serves too as an acoustic matching layer and includes a substantially disc-shaped piezoelectric element having a front-surface joined to the base material and having the rear-surface on the opposite side thereof, whereof the area of the base material is greater than the area of the piezoelectric element, and the piezoelectric element is formed with a plurality of grooves extending in the planar direction, so that such grooves do not cross one another, and the plurality of strip-shaped vibration units are arranged through the grooves, whereof the farther the distance from the center of the piezoelectric element is, the shorter the length of the vibration unit is, and the plurality of the vibration units are connected to one another at the end of the front surface of the piezoelectric element, with the piezoelectric element vibrating in the thickness direction in the first-frequency band and vibrating too in the radial direction in the second-frequency band, which is lower than the first-frequency band.

Therefore, according to the first aspect of this invention, since the plurality of strip-shaped vibration units are obtained by forming grooves in the piezoelectric element, each vibration unit is easily deformed in the height direction, and the piezoelectric element is easily deformed at each portion. As a result, as in the case of forming grooves in the piezoelectric element to obtain a plurality of columnar-vibration units, the piezoelectric element easily vibrates in the thickness direction, so that the electromechanical-coupling coefficient of ultrasonic waves becomes high, thus widening the range of the first-frequency band. Further, the piezoelectric element vibrates not only in the thickness direction within the first-frequency band but also within a frequency band that is different from the first-frequency band. Specifically, the piezoelectric element vibrates in the radial direction within a second-frequency band that is lower than the first frequency band, thus making it possible to widen the frequency band that is suitable for transmitting and receiving ultrasonic waves. Moreover, in the first aspect of this invention, since the strip-shaped vibration unit is obtained by forming grooves extending in the planar direction so that they do not cross one another, compared to the above case where the columnar-vibration unit is obtained by forming such grooves extending vertically and horizontally, the number of times that it takes to form the grooves that are required to form the vibration unit is reduced. As such, the grooves can be formed easily, thus making it possible to reduce the manufacturing cost of the ultrasonic transducer.

Also, the "substantially disc-shaped base-material" includes not only a disc-shaped base-material but also an elliptical plate-shaped base-material and an oval-shaped base-material or the like. Similarly, the "substantially disc-shaped piezoelectric element" includes not only a disc-shaped piezoelectric element but also an elliptical plate-shaped piezoelectric element and an oval-shaped piezoelectric element or the like.

The second aspect of this invention refers to an ultrasonic transducer for a measuring device, which transmits and receives ultrasonic waves according to the first aspect of this invention, characterized in that the maximum value of the width of the vibration unit is less than the thickness of the piezoelectric element, and that the thickness of the piezoelectric element is less than the outer diameter of the piezoelectric element.

Therefore, according to the second aspect of this invention, since the maximum value of the width of the vibration unit is less than the thickness of the piezoelectric element, the vibration unit can be formed into an elongated shape having a width less than the height. As a result, when the vibration unit contracts in the height direction, the vibration unit is easily deformed so as to become thicker by the contracted volume thereof, and when the vibration unit extends in the height direction, the vibration unit is easily deformed toward the center of the vibration unit along the width direction. That is, the vibration unit turns into a shape that is easily to vibrate in the height direction. In other words, the piezoelectric element turns into a shape that is easily to vibrate in the thickness direction. Also, since the thickness of the piezoelectric element is less than the outer diameter of the piezoelectric element, the vibration unit can be an elongated shape having a height less than the length. As a result, when the vibration unit contracts in the length direction, the vibration unit is easily deformed, so as to become thicker by the contracted volume thereof, and when the vibration unit extends in the length direction, the vibration unit is easily deformed, so as to become thinner by the extended volume thereof. In other words, the vibration unit turns into a shape that is easily to vibrate in the length direction. That is, the piezoelectric element turns into a shape that is easily to vibrate in the radial direction. From the above, the electromechanical-coupling coefficient becomes reliably high, so that the transmission/reception sensitivity becomes also reliably high.

The third aspect of this invention refers to an ultrasonic transducer for a measuring device, which transmits and receives ultrasonic waves according to the second aspect of this invention, characterized in that the maximum value of the width of the vibration unit is one fourth or more and half or less of the thickness of the piezoelectric element.

Therefore, according to the third aspect of this invention, since the maximum value of the width of the vibration unit is one fourth or more of the thickness of the piezoelectric element, it is possible to prevent deterioration in the strength of the vibration unit. Further, since the maximum value of the width of the vibration unit is one half or less of the thickness of the piezoelectric element, the vibration unit turns into an elongated shape that easily vibrates in the height direction and does not easily vibrate in the width direction, thus suppressing the combined vibration by vibrating in the vertical direction and by vibrating in the width direction. As a result, the electromechanical-coupling coefficient becomes reliably high, thus reliably improving the transmission/reception sensitivity.

The fourth aspect of this invention refers to an ultrasonic transducer for a measuring device, which transmits and receives ultrasonic waves according to any one of the first to third aspects of this invention, characterized in that outer diameter of the piezoelectric element is more than twice the thickness of the piezoelectric element.

Therefore, according to the fourth aspect of this invention, since the outer diameter of the piezoelectric element is twice or more the thickness of the piezoelectric element, the vibration unit turns into an elongated shape that easily vibrates in the length direction, and the piezoelectric element turns into a shape that easily vibrates in the radial direction. As a result, the electromechanical-coupling coefficient becomes reliably high, thus reliably improving the transmission/reception sensitivity.

The fifth aspect of this invention refers to an ultrasonic transducer for a measuring device, which transmits and receives ultrasonic waves according to any one of the first to fourth aspects of this invention, characterized in that the depth of the grooves is 80% or more and less than 100% of the thickness of the piezoelectric element.

Therefore, according to the fifth aspect of this invention, since the depth of the grooves is 80% or more of the thickness of the piezoelectric element, the vibration unit is easily deformed in the height direction, and the piezoelectric element is easily deformed in the thickness direction. As a result, the transmission/reception sensitivity becomes higher. Moreover, since the depth of the grooves is less than 100% of the thickness of the piezoelectric element, even if the piezoelectric element is divided into a plurality of vibration units in forming the grooves, the thickness of the portion, whereat the vibration units are connected to one another at the end of the front-surface of the piezoelectric element, is secured. As a result, the strength of the piezoelectric element is secured. Further, since the entire front surface of the piezoelectric element is joined to the base material, the contact area between the piezoelectric element and the base material becomes larger, thus improving the joining-strength between the piezoelectric element and the base material.

The sixth aspect of this invention refers to an ultrasonic transducer for a measuring device, which transmits and receives ultrasonic waves according to any one of the first to fifth aspects of this invention, characterized in that the grooves are entirely a void space.

Therefore, according to the sixth aspect of this invention, since the grooves are entirely a void space, the grooves are not filled with a filler. In this case, since the deformation of the vibration unit in the length direction is not hindered by a filler, the vibration unit vibrates easily in the length direction. Eventually, the piezoelectric element easily vibrates in the radial direction. Moreover, since the deformation of the vibration unit in the height direction is not hindered by a filler, the vibration unit easily vibrates in the height direction. As such, the piezoelectric element easily vibrates in the thickness direction. Therefore, the transmission/reception sensitivity is reliably improved.

The seventh aspect of this invention refers to an ultrasonic transducer for a measuring device that transmits and receives the ultrasonic waves, according to any one of the first to fifth aspects of this invention, characterized in that the internal region of said one groove is made of a filling region filled with a filler and made of a non-filling region not filled with a filler.

Therefore, according to the seventh aspect of this invention, since the internal region of each groove between the vibration units has a filing region in which filler is put, the filler enters such region to reinforce each vibration unit. As a result, the occurrence of cracks in the vibration units can be prevented, thus making it possible to improve the reliability of the ultrasonic transducer. Further, since the internal region of each groove has a non-filling region in which filler is not put, the deformation of the vibration units in the length direction is not hindered by filler. As a result, the vibrations unit are likely to vibrate in the length direction, and the piezoelectric element is likely to vibrate in the radial direction. Therefore, it is possible to improve the transmission/reception sensitivity while ensuring the strength of the vibration units.

The eighth aspect of this invention refers to an ultrasonic transducer for a measuring device, which transmits and receives ultrasonic waves according to any one of the first to fifth aspects of this invention, characterized in that the whole internal region of the grooves is filled with a filler.

Therefore, according to the eighth aspect of this invention, the filler enters the whole internal region of the grooves between each vibration unit to reinforce each vibration unit. As a result, the occurrence of cracks in the vibration unit can be prevented, thus making it possible to improve the reliability of the ultrasonic transducer.

The ninth aspect of this invention refers to an ultrasonic transducer for a measuring device, which transmits and receives ultrasonic waves according to the seventh or eighth aspect of this invention, characterized in that the characteristic acoustic impedance of the filler is one tenth or more of the characteristic acoustic impedance of the piezoelectric element, and the specific gravity of the filler is 1.5 or less.

Therefore, according to the ninth aspect of this invention, when setting the characteristic-acoustic impedance of the filler to one tenth or more of the characteristic-acoustic impedance of the piezoelectric element, the difference in the characteristic-acoustic impedance becomes less, and the ultrasonic wave is not likely to be attenuated, thus making it possible to transmit and receive the ultrasonic wave by using the radial vibration of the piezoelectric element. However, when the characteristic-acoustic impedance of the filler is high, the density of the filler is generally high, and the filler becomes heavy. Then, in the ninth aspect of this invention, since the filler is made relatively light by setting the specific gravity of the filler to 1.5 or less, the filler is less likely to be loaded with the vibration of the vibration unit, thus making it possible to prevent a decrease in transmission/reception sensitivity caused by such filler.

Effectiveness of the Invention

As described in detail, above, according to the first to ninth aspects of this invention, it is possible to widen the frequency band suitable for transmitting and receiving ultrasonic waves while also reducing the cost of manufacturing.

BRIEF DESCRIPTION OF THE DRAWINGS

FIG. 10 is a block diagram showing the electrical configuration of the sonar device.

FIG. 11 (a) is a cross-sectional view of the vibration unit being extended, and

FIG. 11 (b) is a cross-sectional view of the vibration unit being contracted.

FIG. 12 shows the relationship between frequency and transmission/reception sensitivity in the Example and in Comparative Examples 1 to 3.

MODES FOR CARRYING OUT THE INVENTION

Hereinafter, the embodiment of the present invention is described in detail with reference to the drawings.

Figure 1:
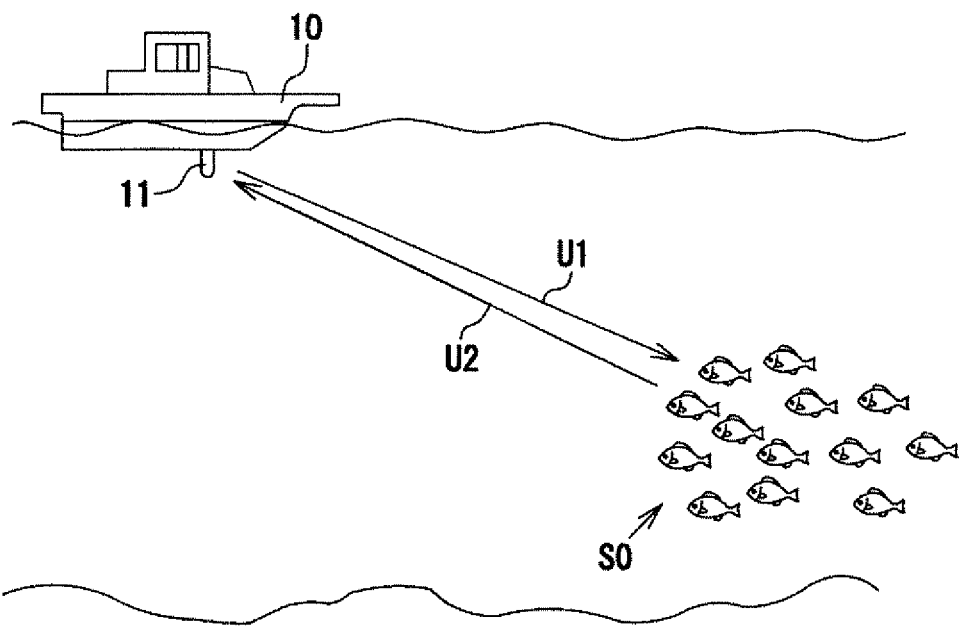
FIG. 1 is an explanatory view showing a ship equipped with the sonar device as the embodiment of this invention.
Figure 2:
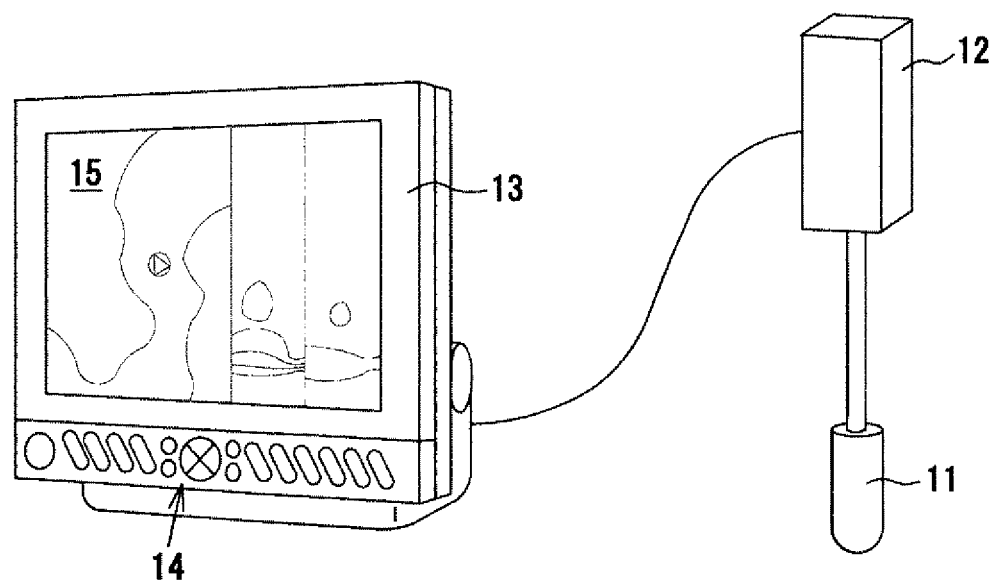
FIG. 2 is a schematic-configuration diagram showing a sonar device, a lifting-lowering device and a monitor.

As shown in FIG. 1, the sonar device 11 as the embodiment of this invention is installed onto the bottom of the ship 10. The sonar device 11 is a measuring device that detects a target object S0 such as a school of fish existing in the water by irradiating an ultrasonic wave U1 into the water. Further, as shown in FIG. 2, the sonar device 11 is attached to the lifting-lowering device 12. The lifting-lowering device 12 is a device that makes the sonar device 11 appear and disappear from the bottom of the ship into the water by raising and lowering the sonar device 11. Furthermore, a liquid-crystal monitor 13 is electrically connected to the lifting-lowering device 12 and sonar device 11. The liquid-crystal monitor 13 is installed in the wheelhouse of the ship 10 and has an operation unit 14 and a display unit 15.

Figure 3:
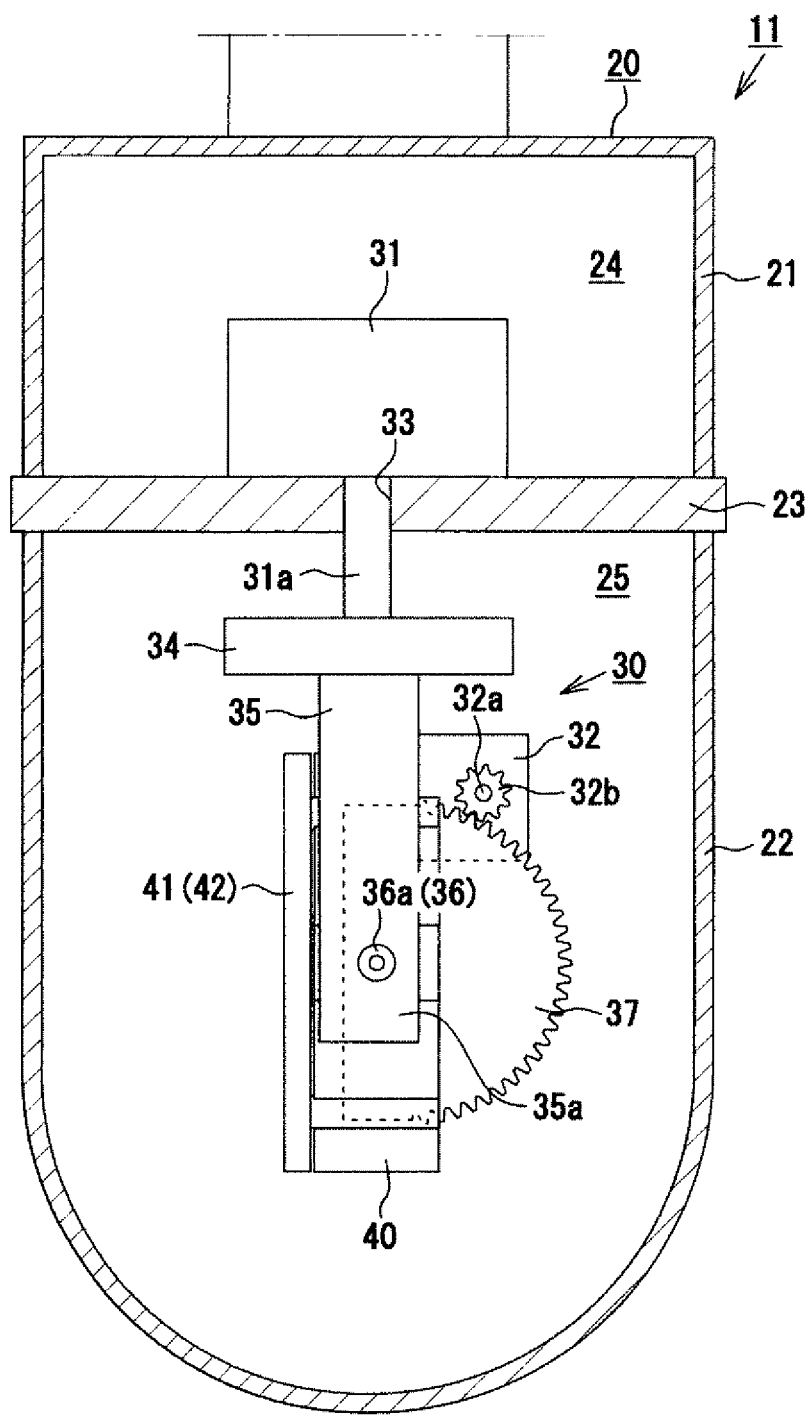
FIG. 3 is a schematic cross-sectional view of the sonar device.
Figure 4:
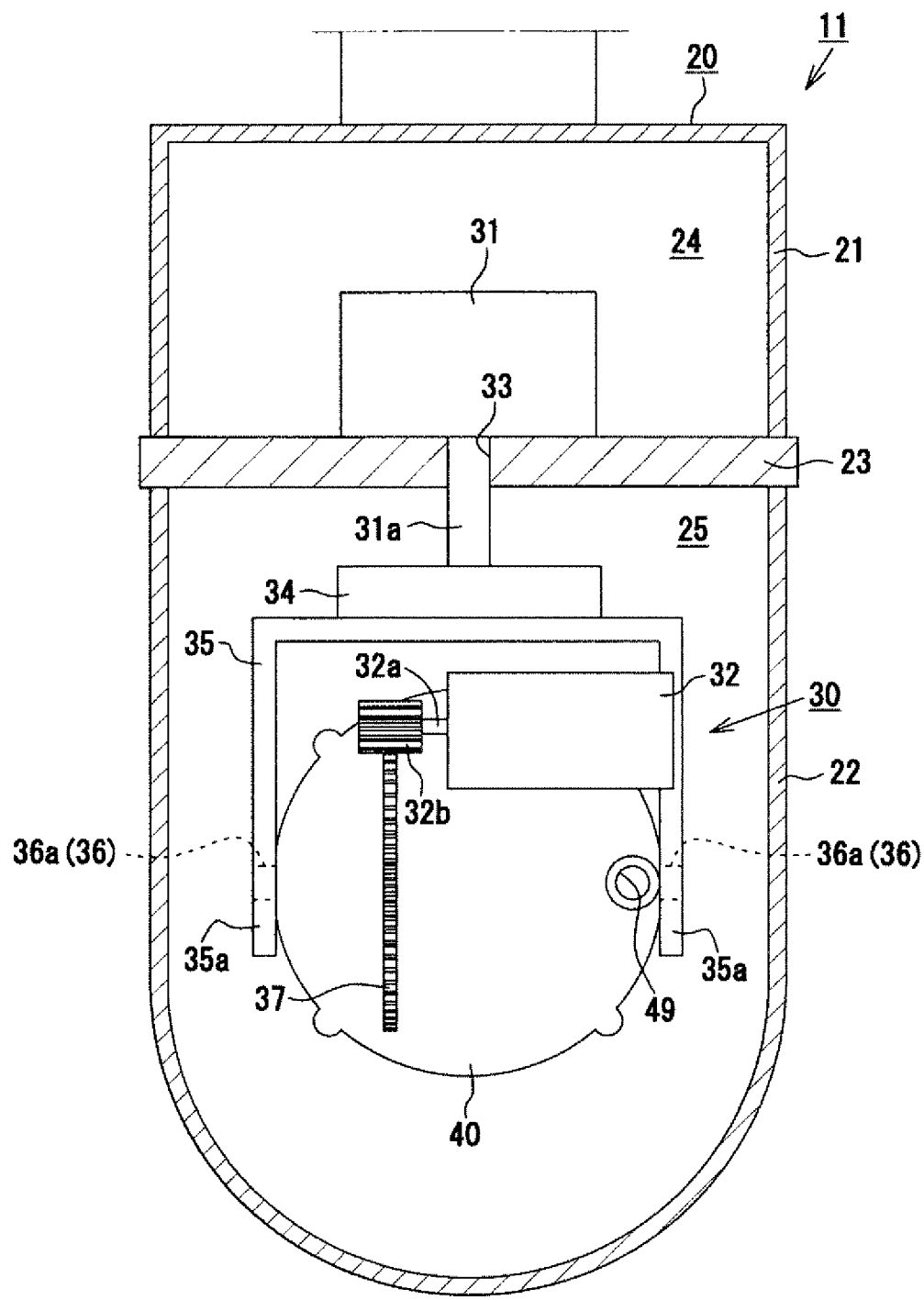
FIG. 4 is another schematic cross-sectional view of the sonar device.

As shown in FIGS. 3 and 4, the sonar device 11 includes a sonar dome 20. The sonar dome 20 is formed of a resin material such as ABS resin (acrylonitrile butadiene styrene resin) or the like and is composed of an upper case 21, a lower case 22 and a lid 23. The upper case 21 is a cylindrical case with a bottom that opens at the lower end, and the lower case 22 is a cylindrical case with a bottom that opens at the upper end. Also, the lower end of the lower case 22 is of a dome shape (hemispherical shape). Further, the lid 23 is of a disk shape and is for closing the lower-end opening of the upper case 21 and the upper-end opening of the lower case 22. The upper-housing space 24 is formed by the lid 23 and upper case 21, and the lower-housing space 25 is formed by the lid 23 and lower case 22.

Further, the sonar dome 20 houses an ultrasonic transducer 41 for the sonar device 11, which transmits and receives the ultrasonic wave U1; a case 40 that houses the ultrasonic transducer 41; and a drive mechanism 30 that moves the ultrasonic transduce 41. The drive mechanism 30 includes a scanning motor 31, a tilt motor 32, and the like. The scanning motor 31 is installed onto the central area of the lid 23 in the upper-housing space 24. A stepping motor is used as the scanning motor 31 for the embodiment of this invention. The rotating shaft 31a of the scanning motor 31 extends vertically and protrudes into the lower-housing space 25 through the through-hole 33 provided in the central area of the lid 23. Further, the tip of the rotating shaft 31a is connected to the central area of the disc-shaped supporting plate 34, and the supporting frame 35 is attached to the lower surface of the supporting plate 34. The supporting frame 35 is of a U-shape having a pair of arms 35a.

As shown in FIGS. 3 and 4, the case 40, using a resin material such as ABS resin, is formed into a bottomed cylindrical shape with one end opened. Further, the case 40 is provided with a tilting shaft 36 orthogonal to the rotating shaft 31a. The tilting shaft 36 is divided into two tilting-shaft portions 36a, and both tilting-shaft portions 36a project in opposite directions from both ends (left-side portion and right-side portion as shown in FIG. 4) of the case 40. The tilting-shaft portions 36a are both fitted into through-holes provided in both arm portions 35a of the supporting frame 35 via bearings (not shown in the drawings). Therefore, when the rotating shaft 31a of the scanning motor 31 rotates, the supporting plate 34, the supporting frame 35, the case 40 and the ultrasonic transducer 41 rotate around the rotating shaft 31a. As such, the irradiation direction of the ultrasonic wave U1, being output from the ultrasonic transducer 41, changes to the circumferential direction of the rotating shaft 31a.

As shown in FIGS. 3 and 4, the tilt-motor 32 is attached to the upper end of the supporting frame 35. A stepping motor is used as the tilt-motor 32 for the embodiment of this invention. The output shaft 32a of the tilt-motor 32 is arranged in parallel with the pair of tilting-shaft portions 36a, and a pinion gear 32b is attached to the tip thereof. The pinion gear 32b is engaged with a substantially semicircular tilt-gear 37 attached to the case 40. Therefore, when the output shaft 32a of the tilt-motor 32 rotates, the pinion gear 32b and the tilt-gear 37 rotate, causing the case 40 and the ultrasonic transducer 41 to perform a tilting motion around the tilting-shaft 36 (tilting-shaft portion 36a). As such, the irradiation angle of the ultrasonic wave U1 being output from the ultrasonic transducer 41 also changes with the tilting motion of the ultrasonic transducer 41.

Figure 5:
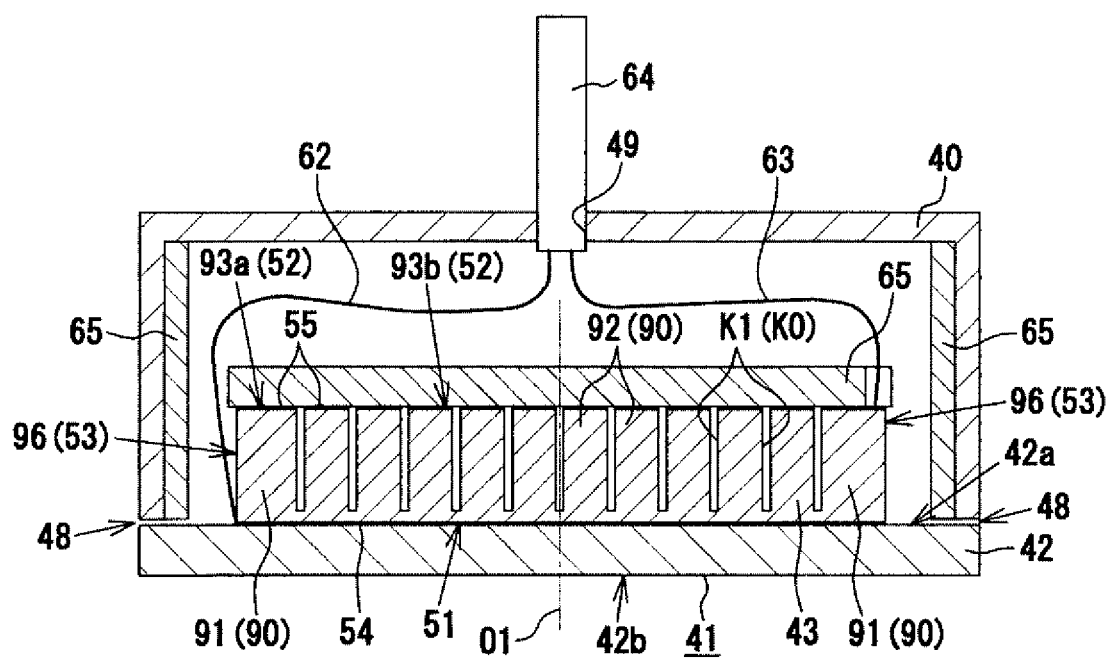
FIG. 5 is a schematic cross-sectional view of the ultrasonic transducer housed in a case.
Figure 6:
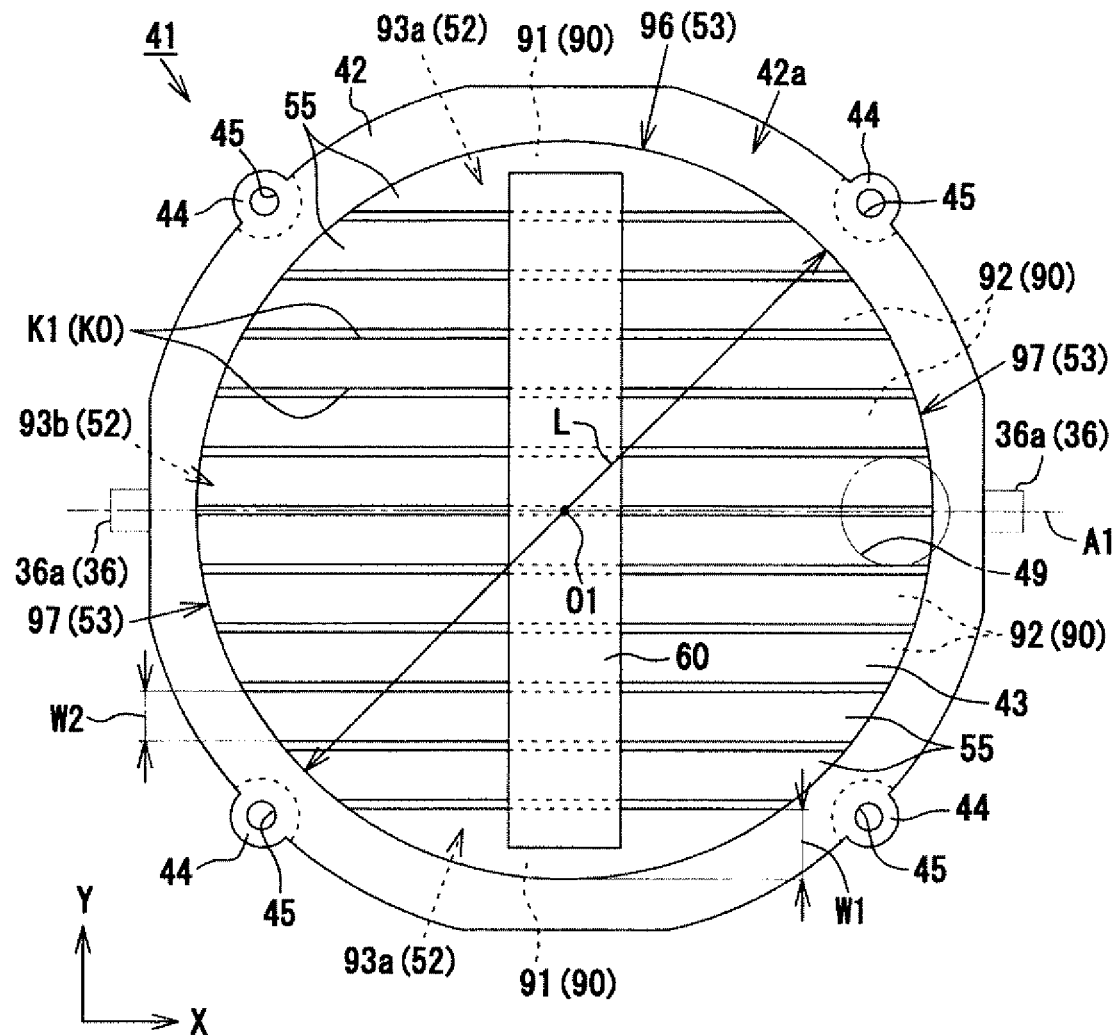
FIG. 6 is a plan-view of the ultrasonic transducer.
Figure 7:
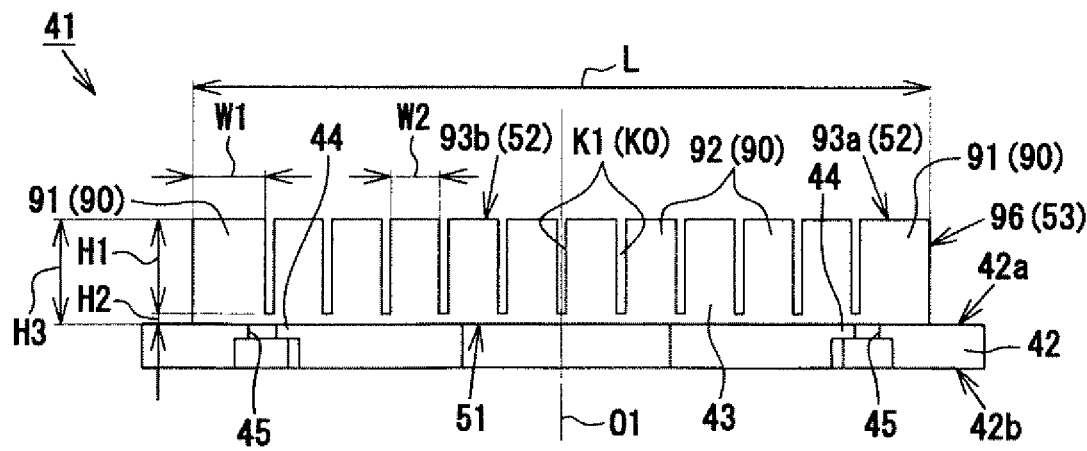
FIG. 7 is a side view of the ultrasonic transducer.

As shown in FIGS. 5 to 7, the ultrasonic transducer 41 includes a base material 42 and a piezoelectric element 43. The base material 42 is a disc-shaped resin plate-like material that serves too as an acoustic-matching layer. Four projecting portions 44 are provided on the outer-peripheral area of the base material 42, and a screw-hole 45 is provided on each projecting portion 44. Each screw-hole 45 is arranged at intervals of an equal angle with respect to the center O1 of the piezoelectric element 43 (ultrasonic transducer 41). Also, each screw-hole 45 is countersunk at the opening on the rear surface 42b of the base material 42. As such, even if a screw (not shown in the drawings) is inserted into the screw-hole 45, the head of the screw does not protrude from the rear surface 42b of the base material 42, thus making it possible to avoid interference between the screw and the sonar dome 20 housing the ultrasonic transducer 41.

Then, a screw is inserted into each screw-hole 45, and the tip of the inserted screw is screwed into the case 40. As a result, the ultrasonic transducer 41 is firmly attached to the case 40. When the ultrasonic transducer 41 is firmly attached to the case 40, a clearance is formed between the case 40 and the base material 42. Then, this clearance becomes the communication port 48 that communicates between the inside and the outside of the case 40.

Figure 8:
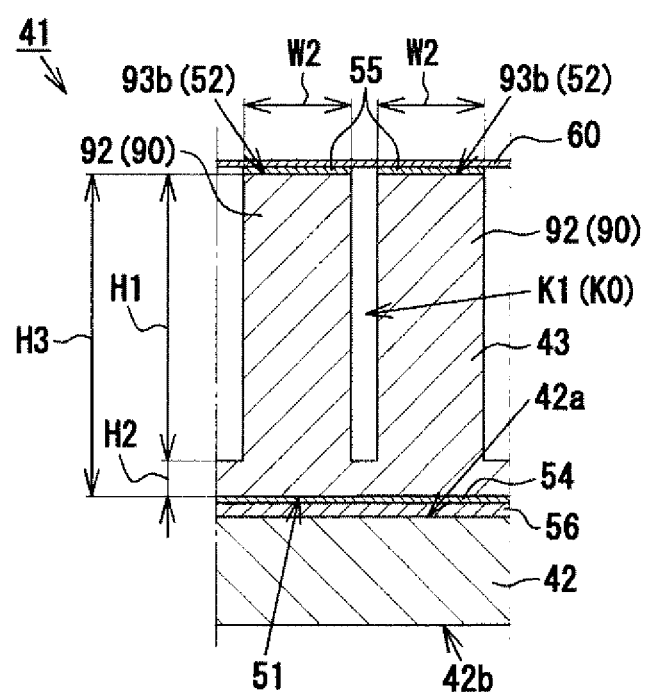
FIG. 8 is a cross-sectional view of the vibration unit.

Also, the piezoelectric element 43 is, for example, a substantially disc-shaped ceramic plate-like object formed of lead-zirconate titanate (PZT), which is a piezoelectric ceramic. As shown in FIGS. 5 to 7, since the outer diameter of the piezoelectric element 43 is less than the outer diameter of the base material 42, the area of the base material 42 is greater than the area of the piezoelectric element 43. Further, the piezoelectric element 43 has a front surface 51 joined to the base material 42; a rear surface 52 on the opposite side of the front surface 51; and an outer-peripheral surface 53 orthogonal to the front surface 51 and to the rear surface 52. Furthermore, as shown in FIGS. 5 and 8, a front-side electrode 54 is formed on the front surface 51 of the piezoelectric element 43, and a rear-side electrode 55 is formed on the rear surface 52 of the piezoelectric element 43. According to the embodiment of this invention, the entire front surface 51 of the piezoelectric element 43 is joined to the base material 42 via the front-side electrode 54 and the adhesive layer 56 (see FIG. 8). In addition, the piezoelectric element 43 is polarized in the thickness direction by applying a voltage between the front-side electrode 54 and the rear side electrode 55.

As shown in FIGS. 5 to 9, the piezoelectric element 43 is composed of a plurality of vibration units 90 that are divided to extend along the thickness direction of the piezoelectric element 43. Each vibration unit 90 is configured in forming a plurality of grooves K1 with respect to the rear surface 52 of the piezoelectric element 43. Each groove K1 extends in one direction (X-direction in FIG. 6) along the surface direction and do not cross one another. Therefore, each vibration unit 90 is arranged via each groove K1 in a direction orthogonal to the direction (Y-direction in FIG. 6) in which each groove K1 extends. Further, the grooves K1 are arranged in parallel with one another at an angle of 0 degree with respect to the central axis A1 (see FIG. 6) of the tilting-shaft 36. That is, each groove K1 is parallel to the central axis A1 of the tilting-shaft 36. Further, regarding the embodiment of this invention, among the grooves K1, the groove K1 located at the central area is located on the central axis A1 of the tilting-shaft 36. The width of each groove K1 is less than the width of the vibration unit 90, and regarding the embodiment of this invention, each groove K1 is one tenth or more and one third or less of the width of the vibration unit 90. In addition, the width of each groove K1 is equal to one another. Further, since each groove K1 is not filled with any filler made of a resin material (epoxy resin, urethane resin, silicone resin, or the like) or an adhesive (epoxy adhesive, or the like), each groove K1 is entirely a void space K0.

Figure 9:
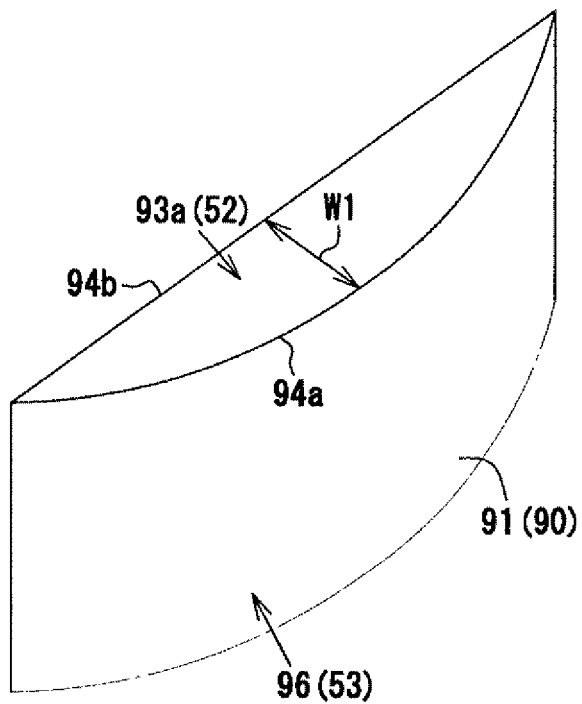
FIG. 9 (a) is a perspective view of the outer-vibration unit, and FIG. 9 (b) is a perspective view of the inner-vibration unit.
Figure 9:
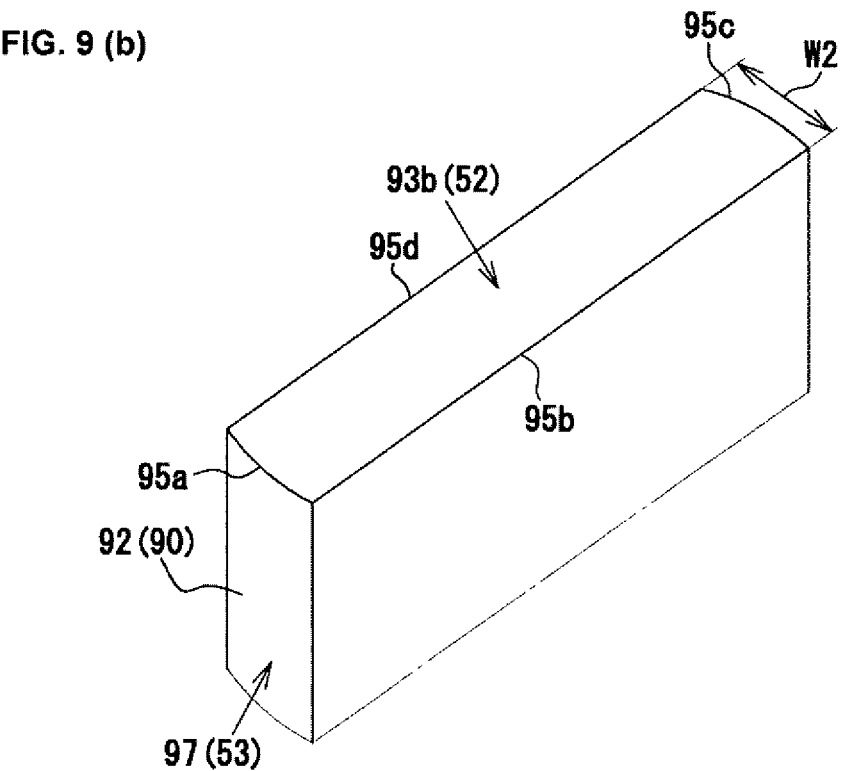

As shown in FIGS. 6 to 9, each vibration unit 90 is composed of a pair of outer-vibration units 91 located at both ends (upper end and lower end, as shown in FIG. 6), and a plurality of inner-vibration units 92 are arranged between the two outer-vibration units 91. Each vibration unit 90 is of a strip shape when viewed from the rear surface. Specifically, as shown in FIG. 9 (a), the surface 93a (rear surface 52) of the outer-vibration unit 91 is composed of two sides 94a and 94b, and the side 94a is of a circular-arc shape in the rear-surface view, and the side 94b is of a linear shape in the rear-surface view. Also, as shown in FIG. 9 (b), the surface 93b (rear surface 52) of the inner-vibration unit 92 is composed of four sides 95a, 95b, 95c and 95d. The sides 95a and 95c are of a circular-arc shape in the rear-surface view, and the sides 95b and 95d are of a linear shape in the rear-surface view. The outer surface 96 of both outer-vibration units 91 and both end-surfaces 97 of each inner-vibration unit 92 form an outer-peripheral surface 53 of the piezoelectric element 43.

Further, according to the embodiment of this invention, among the vibration units 90, the vibration unit 90 (inner-vibration unit 92) located at the central area has the longest length, which is substantially equal to the outer diameter of the piezoelectric element 43. In addition, the longer the distance from the center O1 of the piezoelectric element 43, the shorter the length of the vibration unit 90. Also, the width W1 of the outer-vibration unit 91 is greater than the width W2 of the inner-vibration unit 92.

As shown in FIGS. 6 to 9, both outer-vibration units 91 and each inner-vibration unit 92 are connected to each other at the end of the front surface 51 of the piezoelectric element 43. Also, the length of the outer-vibration unit 91 is greater than the height H1 of the outer-vibration unit 91, and the length of the inner-vibration unit 92 is greater than the height H1 of the inner-vibration unit 92. In addition, the length of the outer-vibration unit 91 is less than the length of the inner-vibration unit 92, and the minimum value of the length of the vibration unit 90 is greater than the height H1 of the vibration unit 90. Also, the height H1 of the outer-vibration unit 91 is greater than the width W1 of the outer-vibration unit 91, and the height H1 of the inner-vibration unit 92 is greater than the width W2 of the inner-vibration unit 92. In addition, the height H1 of the vibration units 91 and 92 is equal to the depth of the grooves K1. Further, the thickness of the base material 42, described above, is less than the height H1 of the vibration units 91 and 92. Further, the thickness H2 of the portion of the piezoelectric element 43 where the vibration units 91 and 92 are connected to each other is less than the thickness of the base material 42. Furthermore, the thickness H3 (height H1 of the vibration units 91 and 92) of the piezoelectric element 43 is arbitrarily determined. However, it is determined, for example, that the "vibration in the longitudinal direction" of the vibration units 91 and 92 is a target-resonance frequency.

Further, according to the piezoelectric element 43 as the embodiment of this invention, the maximum value of the width of the vibration unit 90 (specifically, the width W1 of the outer-vibration unit 91 or the width W2 of the inner vibration unit 92) is less than the thickness H3 of the piezoelectric element 43. Specifically, it is one fourth or more yet half or less of the thickness H3. Moreover, the maximum value of the width of the vibration unit 90 is less than the depth of the grooves K1. In addition, the thickness H3 of the piezoelectric element 43 is less than the outer diameter of the piezoelectric element 43, and the outer diameter of the piezoelectric element 43 is twice or greater than the thickness H3 of the piezoelectric element 43. Further, the depth of the grooves K1 is less than the thickness H3 of the piezoelectric element 43. Specifically, the depth is 80% or more but less than 100% of the thickness H3.

According to the piezoelectric element 43 as the embodiment of this invention, the relationship between the maximum value W of the width of the vibration unit 90 and the minimum value L of the outer diameter of the piezoelectric element 43 satisfies the expression: $0.05 \le W/L \le 0.1$, particularly $0.07 \le W/L \le 0.1$. The minimum value L of the embodiment of this invention is equal to the outer diameter of the piezoelectric element 43. This indicates that 10 or more vibration units 90 exist in the piezoelectric element 43. By doing so, the composite vibration is reduced, and the sensitivity of the specific portion is improved, so that the sensitivity in the vicinity of the specific portion is also improved, thus widening the frequency band of the ultrasonic wave U1.

As shown in FIGS. 6 and 8, a rear-side electrode 55 is formed respectively on the surface 93a of both outer-vibration units 91 and on the surface 93b of each inner-vibration unit 92. Then, a metal foil 60 (for example copper foil, brass foil, aluminum foil or the like), which is a strip-shaped conductive member, is attached so as to stretch over each of the plurality of rear-side electrodes 55. Also, the metal foil 60 is attached to each rear-side electrode 55 by a conductive metal such as solder or an adhesive agent containing a conventionally known conductive filler. By attaching the metal foil 60, the metal foil 60 becomes a common electrode on the surface 93a of both outer-vibration units 91 and on the surface 93b of each inner-vibration unit 92.

Then, as shown in FIG. 5, the first lead-wire 62 is connected to the front-side electrode 54, and the second lead-wire 63 is connected to the rear-side electrode 55. The first lead-wire 62 is connected to a side terminal (not shown in the drawing) extending outward from the front-side electrode 54 by soldering or the like. The second lead-wire 63 is connected to any one of the plurality of rear-side electrodes 55 by soldering or the like. Then, the first lead-wire 62 and the second lead-wire 63 are banded together by the wiring tube 64 and pulled out of the case 40 through the wiring-insertion hole 49 provided on top of the case 40. Also, the first lead-wire 62 is connected to the side terminal. However, it is possible to attach a metal foil (not shown in the drawings) such as copper foil or the like on the front-side electrode 54 or on the surface 42a of the base material 42, so that the first lead-wire 62 may be connected to the metal foil by soldering or the like.

Also, a sheet-shaped soundproofing material 65 (backing material) is attached to the rear surface 52 of the piezoelectric element 43. The soundproofing material 65 is for suppressing reverberation and is also attached to the inner-peripheral surface of the case 40. As the soundproofing material 65, a resin material or a rubber containing particles or fibers made of metal or ceramics, or a resin material having pores dispersedly provided (sponge or the like) can also be used.

The sonar-device dome 20, as shown in FIGS. 3 and 4, is filled with an ultrasonic-wave propagating liquid (not shown in the drawings) that propagates the ultrasonic wave U1. Further, a part of the ultrasonic-wave propagating liquid flows into the case 40 through the communication port 48 provided on the case 40 and flows into the void space K0 (grooves K1) between the adjacent vibration units 90 in the piezoelectric element 43, thus filling the void space K0. Also, the ultrasonic-wave propagating liquid for the embodiment of this invention is liquid paraffin. Further, the characteristic-acoustic impedance of the base material 42, as described above, is less than the characteristic-acoustic impedance of the piezoelectric element 43 and is greater than the characteristic-acoustic impedance of the ultrasonic-wave propagating liquid and greater than the characteristic-acoustic impedance of water.

Next, the electrical configuration of the sonar device 11 is described.

As shown in FIG. 10, the liquid-crystal monitor 13 of the sonar device 11 includes a control device 70 that integrally controls the entire device. The control device 70 is composed of a well-known computer including a CPU 71, a ROM 72, a RAM 73, or the like.

The CPU 71 is electrically connected to the scanning motor 31 and to the tilt motor 32 via the motor driver 81 and controls them by various drive signals. In addition, the CPU 71 is electrically connected to the ultrasonic transducer 41 via the transmission/reception circuit 82. The transmission/reception circuit 82 outputs an oscillation signal to the ultrasonic transducer 41 to drive the ultrasonic transducer 41. As a result, the ultrasonic transducer 41 irradiates (transmits) the ultrasonic wave U1 into the water. An electric signal, indicating the ultrasonic wave U1 (reflected wave U2) received by the ultrasonic transducer 41, is input to the transmission/reception circuit 82. Further, the CPU 71 is electrically connected to the lifting-lowering device 12, to the operation unit 14, to the display unit 15 and to the GPS (Global Positioning System) receiving unit 83, respectively.

Then, the CPU 71, as shown in FIG. 10, controls the transmission/reception circuit 82 to irradiate the ultrasonic wave U1 from the ultrasonic transducer 41 and also controls driving the lifting-lowering device 12. The CPU 71 controls the motor driver 81 to drive the scanning motor 31 and the tilt motor 32, respectively. The data on the location of the ship 10, received by the GPS-receiving unit 83, is entered into the CPU 71.

Further, via the transmission/reception circuit 82, the CPU 71 receives the reception signal that is generated once the ultrasonic transducer 41 receives the reflected wave U2. Then, the CPU 71 generates the detected-image data, based on the reception-signal received, and stores such generated detected-image data in the RAM 73. The CPU 71 then directs the display unit 15 to display the detected image based on the detected-image data that was stored in the RAM 73.

Next, the method for detecting the target object S0 to be detected using the sonar device 11, is described.

First, the electrical power (not shown in the drawings) of the sonar device 11, of the lifting-lowering device 12 and of the liquid-crystal monitor 13 is switched on. At this time, the data on the location of the ship 10 is entered into the CPU 71 of the control device 70 from the GPS receiving unit 83. Then, the CPU 71 directs the transmission/reception circuit 82 to output an oscillation signal to the ultrasonic transducer 41, thus driving it. At this time, each vibration unit 90 of the piezoelectric element 43 repeats contraction (see FIG. 11(b)) and expansion (see FIG. 11(a)). When the vibration unit 90 contracts in the height direction, the vibration unit 90 deforms in the width direction, specifically, deforms on the outer-peripheral side of the vibration unit 90 (see arrow F1 in FIG. 11(b)), so that it becomes thicker only by the contracted volume. Then, when the vibration unit 90 extends in the height direction, the vibration unit 90 deforms in the width direction, specifically, deforms toward the central side of the vibration unit 90 (see arrow F2 in FIG. 11(a)). As a result, the piezoelectric element 43 vibrates, and the ultrasonic wave U1 is irradiated (transmitted) from the ultrasonic transducer 41 into the water.

Then, when the ultrasonic wave U1 reaches the target object S0 (see FIG. 1), the ultrasonic wave U1 is reflected by the target object S0 to become the reflected wave U2 that propagates toward the sonar device 11 and enters into (is received by) the ultrasonic transducer 41. After that, the ultrasonic wave U1 (reflected wave U2), received by the ultrasonic transducer 41, is converted into the reception signal and enters the CPU 71 via the transmission/reception circuit 82. At this time, the target object S0 is detected.

Further, the CPU 71 controls driving the scanning motor 31 via the motor driver 81, thus allowing the ultrasonic transducer 41 to perform a turning motion around the rotating shaft 31a. In addition, the CPU 71 controls driving the tilt motor 32 via the motor driver 81, thus allowing the ultrasonic transducer 41 to perform a tilting motion around the center of the tilting-shaft 36. As a result, as the irradiation direction of the ultrasonic wave U1 gradually changes, the detection range also gradually changes. After that, when the operator turns off the power, the control device 70 stops the transmission/reception circuit 82, and the irradiation of the ultrasonic wave U1 and the reception of the reflected wave U2 are completed.

Hereinafter, the method for manufacturing the ultrasonic transducer 41 is described.

First, the base material 42 is prepared. Specifically, a resin plate-like material made of glass epoxy (FR-4) or the like is processed by cutting it into a circular shape. Then, a ceramic plate-like object to become the piezoelectric element 43 is prepared. Specifically, a disc-shaped ceramic-sintered body made of lead zirconate titanate (PZT) is produced. Then, surface polishing is done to obtain a ceramic plate-like object. Then, an electrode-forming step is done to form the front-side electrode 54 on the front surface 51 of the ceramic plate-shaped object and to form the rear-side electrode 55 on the rear surface 52 of the ceramic plate-like object. Specifically, silver paste is applied onto the front surface 51 and onto the rear surface 52 of the ceramic plate-like object, respectively, and then the applied silver paste is fired to form the electrodes 54 and 55. Then, by applying voltage between the front-side electrode 54 and the rear-side electrode 55, a polarization process is done to polarize the ceramic plate-like object in the thickness direction.

Subsequently, in the joining-step, a ceramic plate-like object is joined to one side of the base material 42 via the front-side electrode 54. Specifically, an adhesive (epoxy-based adhesive or the like) to become the adhesive layer 56 is applied either onto the surface of the front-side electrode 54 or onto the surface 42a of the base material 42, so that the ceramic plate-like object is adhesively fasten onto the base material 42. Instead of applying the adhesive, brazing may be done using solder or the like.

In the vibration-unit-forming step after the joining-step, a plurality of grooves K1 are formed on the rear surface 52 of the ceramic plate-like object by performing a cutting process or the like. As a result, the ceramic plate-like object is divided into a plurality of vibration units 90, and the rear-side electrodes 55 formed on the rear surface 52 of the ceramic plate-like object are also divided into a plurality (of the same number as the vibration units 90). At this point, the piezoelectric element 43 is completed. Since each vibration unit 90 is divided while being connected to one another at the end-portion of the front surface 51 of the piezoelectric element 43, even the front-side electrode 54 formed on the front surface 51 is not divided. After that, the metal foil 60 is attached so as to stretch over each of the plurality of rear-side electrodes 55, and each rear-side electrode 55 is used as a common electrode for the surfaces 93a and 93b of each vibration unit 90. At this point, the ultrasonic transducer 41 is completed.

After the ultrasonic transducer 41 is completed, the first-lead wire 62 is connected to the front-side electrode 54 via a side terminal (not shown in the drawings) by soldering or the like, and the second-lead wire 63 is connected to the rear-side electrode 55 by soldering or the like. Then, a soundproofing material 65 for suppressing reverberation is attached to the rear surface 52 of the piezoelectric element 43. The soundproofing material 65 is also attached to the inner surface of the case 40. After that, the piezoelectric element 43 of the ultrasonic transducer 41 is housed in the case 40. Then, in this state, a screw (not shown in the drawings) is inserted into a plurality of screw holes 45 provided on the base material 42 to fasten the tip of that inserted screw onto the case 40. As a result, the ultrasonic transducer 41 is firmly attached to the case 40 (see FIG. 5). Further, the case 40 to which the ultrasonic transducer 41 is firmly attached is housed in the sonar-device dome 20, and the pair of tilting shaft portions 36a of the case 40 are respectively engaged with the through-holes provided in both arm portions 35a of the supporting frame 35. Then, the sonar-device dome 20 is filled with an ultrasonic-wave propagating liquid (not shown in the drawings). At this point, the ultrasonic transducer 41 is incorporated into the sonar-device dome 20, and the sonar device 11 is thus completed.

A part of the ultrasonic-wave propagating liquid flows into the case 40 through the communication port 48 provided on the case 40 but does not completely enter the grooves K1 between the vibration units 90 adjacent to one another of the piezoelectric element 43. As a result, air remains in most of the internal region of the grooves K1. It is possible, depending on the manufacturing method, to fill the entire internal region of the grooves K1 with the ultrasonic-wave propagating liquid. However, if it is not filled, the load applied to each vibration unit 90 is less, thus improving the transmission/reception sensitivity. Therefore, according to the embodiment of this invention, the inner region of the grooves K1 is intentionally not filled with the ultrasonic-wave propagating liquid. Here, as the method for preventing the ultrasonic-wave propagating liquid from entering the grooves K1, it is conceivable that the soundproofing material 65 should be wound around the outer-peripheral surface 53 of the piezoelectric element 43, or that the ultrasonic-wave propagating liquid should be vigorously poured into the outer-peripheral surface 53 of the piezoelectric element 43, thus covering the outer-peripheral surface 53 of the piezoelectric element 43.

Hereinafter, the method for evaluating the ultrasonic transducer and the result thereof is described.

First, a measuring sample was prepared as follows. An ultrasonic transducer (an ultrasonic transducer, i.e., similar to the ultrasonic transducer 41 as the embodiment of this invention) in which a plurality of strip-shaped vibration units are formed by forming a plurality of grooves extending in one direction with respect to the rear surface of the disc-shaped piezoelectric element was prepared, and this is referred to as the Example. Specifically, first, a piezoelectric element having an outer diameter of 50 mm and a thickness of 7.2 mm was adhered to the base material (glass-epoxy plate) having an outer diameter of 54 mm and a thickness of 3.6 mm. Then, eleven grooves having a width of 0.5 mm and a depth that is about 95% of the thickness of the piezoelectric element were formed at a pitch of 3.5 mm at equal intervals and in parallel. Then, the strip-shaped copper foil was soldered so as to stretch over each of the electrodes on the surface of each vibration unit, and this was housed in the case.

In addition, an ultrasonic transducer not having grooves formed on the rear surface of the disc-shaped piezoelectric element was prepared, and this is referred to as Comparative Example 1. Specifically, first, the piezoelectric element was adhered to the base material. Then, wiring was applied to the electrodes on the rear surface of the piezoelectric element, and this was housed in a case.

Further, an ultrasonic transducer in which a plurality of columnar-vibration units are formed by forming a plurality of grooves extending vertically and horizontally with respect to the rear surface of the disc-shaped piezoelectric element was prepared, and this is referred to as Comparative Example 2. Specifically, first, the piezoelectric element was adhered to the base material. Then, eleven grooves were formed at equal intervals and in parallel. Further, after rotating the piezoelectric element by 90 degrees, similar eleven grooves were formed at equal intervals and in parallel. Further, a copper foil was soldered to each of the electrodes on the surface of each vibration unit, and this was housed in a case.

Also, an ultrasonic transducer in which a plurality of strip-shaped vibration units are formed by forming a plurality of grooves extending in one direction with respect to the rear surface of the rectangular plate-shaped piezoelectric element was prepared, and this is referred to as Comparative Example 3. Specifically, first a piezoelectric element having a length of 36 mm and a width of 36 mm was adhered to a base material having a length of 40 mm and a width of 40 mm. Then, ten grooves were formed at equal intervals and in parallel. Further, the strip-shaped copper foil was soldered so as to stretch over each of the electrodes on the surface of each vibration unit, which vibration units were housed in the case.

Next, the transmission/reception sensitivity of the ultrasonic transducer was calculated according to each measurement sample (Examples and Comparative Examples 1 to 3). Specifically, the radiation face of the ultrasonic transducer was immersed in water, and ultrasonic waves were vertically irradiated to an FRP plate located one meter away from the radiation face. The ultrasonic wave was a burst-wave having a voltage amplitude of 100V. Then, the ultrasonic waves (reflected waves) reflected by the FRP plate are received by the ultrasonic transducer, and voltage signals are generated at both ends of the ultrasonic transducer. At this time, the voltage amplitude, when the ultrasonic transducer transmits and receives, is measured by an oscilloscope, and calculation was performed based on the measurement result, thus calculating the transmission/reception sensitivity. The transmission/reception sensitivity is the ratio of the amplitude Vr of the reception voltage to the amplitude Vs of the transmission voltage and is calculated under the formula of 20×log (Vr/Vs).

Further, regarding each measurement sample, the frequency was switched at a few levels between the range of 20 kHz and 400 kHz, and the ultrasonic waves were irradiated at each switched frequency. Then, the transmission/reception sensitivity of the ultrasonic transducer was calculated using the above-mentioned method adopting an oscilloscope. The graph of FIG. 12 shows the relationship between the frequency and transmission/reception sensitivity regarding Examples and Comparative Examples 1 to 3.

As a result, regarding the Example in which the grooves extending in one direction are formed with respect to the disc-shaped piezoelectric element, it was confirmed that the piezoelectric element vibrates in the thickness direction in the first-frequency band whereof the transmission/reception sensitivity peaks at 230 kHz, and at the same time the piezoelectric element vibrates in the radial direction in the second-frequency band that is lower than the first-frequency band and whereof the transmission/reception sensitivity peaks at 75 kHz. Also, it was confirmed that the range in which the transmission/reception sensitivity is for example −45 dB or more, is around 130 kHz to 350 kHz in the first-frequency band and is around 50 kHz to 80 kHz in the second-frequency band. Further, according to the Example, it was confirmed that the transmission/reception sensitivity in the vicinity of 130 kHz to 350 kHz is equivalent to that of Comparative Examples 2 and 3 but higher than that of Comparative Example 1 by approximately 15 dB. Regarding the Example, the disc-shaped piezoelectric element is adhered to the disc-shaped base material to form the grooves extending in only one direction, so that vibration is likely to occur in the radial direction of the disc-shaped base material. Therefore, regarding the Example, it was confirmed that the transmission/reception sensitivity in the vicinity of 50 kHz to 80 kHz is approximately 10 dB higher than that in all of Comparative Examples 1 to 3. From the above, it was confirmed that regarding to the Example, both the first-frequency band and the second-frequency band are suitable for transmitting and receiving ultrasonic waves.

On the other hand, it was confirmed that regarding Comparative Example 1 in which no grooves are formed on the disc-shaped piezoelectric element, the piezoelectric element vibrates in the thickness direction in the frequency band whereof the transmission/reception sensitivity peaks at around 200 kHz, and that it also vibrates in the radial direction in the frequency band whereof the transmission/reception sensitivity peaks around 50 kHz. However, it was confirmed that regarding Comparative Example 1, the transmission/reception sensitivity was low as a whole. Thus, it was confirmed that the range, in which the transmission/reception sensitivity is for example −45 dB or more, is around 200 kHz to 230 kHz in the frequency band peaking around 200 kHz and is only around 50 kHz in the frequency band peaking around 50 kHz, thus the range is extremely narrower than that of the Example. Therefore, it was confirmed that regarding Comparative Example 1, the reverberation of the ultrasonic wave became long. In other words, it was confirmed that regarding Comparative Example 1, neither of the two above-mentioned frequency bands is suitable for transmitting and receiving ultrasonic waves.

Also, it was confirmed that regarding Comparative Example 2 in which the grooves extending vertically and horizontally are formed with respect to the disc-shaped piezoelectric element, the piezoelectric element vibrates in the thickness direction in the frequency band whereof the transmission/reception sensitivity peaks at 230 kHz and vibrates in the radial direction in the frequency band whereof the transmission/reception sensitivity peaks at 75 kHz. Further, it was confirmed that the range, in which the transmission/reception sensitivity is for example −45 dB or more, is around 130 kHz to 350 kHz in the frequency band peaking at 230 kHz and is around 50 kHz to 80 kHz in the frequency band peaking at 75 kHz. However, it was confirmed that regarding Comparative Example 2, the transmission/reception sensitivity in the vicinity of 130 kHz to 350 kHz was equivalent to that of the Example, but that the transmission/reception sensitivity in the vicinity of 50 kHz to 80 kHz was generally lower than that of the Example. From the above, it was confirmed that regarding Comparative Example 2, the frequency band having a peak of 230 kHz is suitable for transmitting and receiving ultrasonic waves, but that the frequency band having a peak of 75 kHz is not suitable for transmitting and receiving ultrasonic waves.

Further, it was confirmed that regarding Comparative Example 3 in which the grooves extending in one direction are formed with respect to the rectangular piezoelectric element, the piezoelectric element vibrates in the thickness direction in the frequency band whereof the transmission/reception sensitivity peaks at 240 kHz and vibrates in the radial direction in the frequency band whereof the transmission/reception sensitivity peaks at 55 kHz. Then, it was also confirmed that the range, in which the transmission/reception sensitivity is for example −45 dB or more, is around 130 kHz to 350 kHz in the frequency band peaking at 240 kHz and is only around 55 kHz in the frequency band peaking at 55 kHz. It was also confirmed that regarding Comparative Example 3, the transmission/reception sensitivity in the vicinity of 130 kHz to 350 kHz was slightly lower due to the small area of the electrode formed on the tip surface of the vibration unit and was thus inferior to that of the Example. It was further confirmed that regarding Comparative Example 3, the transmission/reception sensitivity in the vicinity of 55 kHz was lower than that of the Example. From the above, it was confirmed that regarding Comparative Example 3, the frequency band having a peak of 240 kHz is suitable for transmitting and receiving ultrasonic waves, but that the frequency band having a peak of 55 kHz is not suitable for transmitting and receiving ultrasonic waves.

Therefore, the embodiments of this invention realize the following effectiveness.

(1) According to the ultrasonic transducer 41 as the embodiment of this invention, since the plurality of strip-shaped vibration units 90 are obtained by forming the grooves K1 on the piezoelectric element 43, each of the vibration units 90 is easily deformed in the height direction. As such, the piezoelectric element 43 is easily deformed at each part. As a result, the piezoelectric element 43 easily vibrates in the thickness direction as in the case whereof a plurality of columnar-vibration units are obtained by forming the grooves on the piezoelectric element, so that the electromechanical-coupling coefficient of the ultrasonic wave U1 becomes higher, thus widening the range of the first-frequency band. Furthermore, the piezoelectric element 43 vibrates not only in the thickness direction of the first-frequency band but also in a frequency band different from the first-frequency band, specifically, in the radial direction of the second-frequency band that is lower than the first-frequency band. Further, the transmission/reception sensitivity of the second-frequency band is for example around −35 dB at the peak, which is as high as the peak of the transmission/reception sensitivity of the first-frequency band (i.e., about −30 dB). Therefore, it is possible to widen the frequency band suitable for transmitting and receiving the ultrasonic wave U1. Moreover, since the vibration unit 90 is strip-shaped, each vibration unit 90 is more likely to vibrate in the radial direction than when the vibration unit is columnar shaped. As such, the electromechanical-coupling coefficient of the ultrasonic wave U1 is further increased, thus widening the range of the second-frequency band. From the above, the ultrasonic transducer 41 is driven by switching between the first-frequency band (around 130 kHz to 350 kHz) vibrating in the thickness direction and the second-frequency band (around 50 kHz to 80 kHz) vibrating in the radial direction, thus making it possible to transmit and receive the ultrasonic waves U1 in each frequency band.

Moreover, according to the embodiment of this invention, the strip-shaped vibration unit 90 is obtained by forming the grooves K1 extending in the planar direction so as not to cross one another. Therefore, compared to the case where the groove extending vertically and horizontally are formed to obtain the columnar-vibration unit as described above, the number of times to form the grooves K1 required for forming the vibration unit 90 becomes half, and the grooves can easily be formed, thus making it possible to reduce the manufacturing cost of the ultrasonic transducer 41.

Further, according to the embodiment of this invention, the further the distance from the center O1 of the piezoelectric element 43, the shorter is the length of the vibration unit 90. In this case, since the individual resonance frequencies are different, and the frequency bands in which vibration in the length direction occurs is slightly deviated, although such vibration in the length direction occurs in each vibration unit 90, whenever the individual frequency bands are synthesized with each other, the width of the frequency band becomes wider (see the second-frequency band of Example in FIG. 12). Therefore, the frequency band of the ultrasonic wave U1 becomes even wider.

(2) For example, in the case whereof a columnar-vibration unit is formed on the piezoelectric element of the ultrasonic transducer, if the ultrasonic transducer is driven for a long time, there is the high probability that a crack will occur in the vibration unit due to fatigue fracture. In the case whereof the ultrasonic transducer is continuously driven at a high voltage in a state in which cracks are generated, an electric discharge intermittently occurs from the cracked generation position, thus resulting in the problem in which deterioration of the piezoelectric characteristics is caused also in the other vibration units of the piezoelectric element, and that the transmission/reception sensitivity is lowered. On the other hand, according to the embodiment of this invention, the strip-shaped vibration units 90 are formed on the piezoelectric element 43. In this case, since the vibration units 90 are longer in the planar direction compared to the columnar-vibration unit, the joint area between the end-portion (the portion whereat the vibration units 90 are connected to one another) on the front surface 51 of the piezoelectric element 43 and the vibration units 90 becomes greater so that the vibration units 90 become of a stable shape, thus making it harder for them to fall down, thus making it possible to prevent a decrease in the strength of the vibration units 90. Therefore, even if the ultrasonic transducer 41 is driven for a long time, the above-mentioned problem caused by the occurrence of cracks is less likely to occur. That is, the reliability of the ultrasonic transducer 41 can be improved by suppressing the occurrence of cracks.

(3) According to the embodiment of this invention, the width W1 of the outer-vibration units 91 is greater than the width W2 of the inner-vibration units 92, so that the outer-vibration units 91 are greater in the width direction than the inner-vibration units 92. Thus, the strength of the outer-vibration units 91 whose entire outer surfaces 96 are exposed to the piezoelectric element 43 increases, thus reliably preventing the outer-vibration units 91 from being cracked. As such, the piezoelectric element 43 can be reinforced at the outer-peripheral region where an external force is likely to act, since it is exposed to the outside, thus further improving the reliability of the ultrasonic transducer 41.

(4) Further, according to the embodiment of this invention, since the piezoelectric element 43 is reinforced by extending the vibration units 90 in the planar direction, it is unnecessary to fill the void space K0 (grooves K1) between the vibration units 90 with a filler. In this case, since deformation of the vibration units 90 in the length direction is not hindered by the filler, the vibration units 90 are likely to vibrate in the length direction, and eventually the piezoelectric element 43 is likely to vibrate in the radial direction. Moreover, since the deformation of the vibration units 90 in the height direction are not hindered by the filler, the vibration units 90 are likely to vibrate in the height direction, and eventually the piezoelectric element 43 is likely to vibrate in the thickness direction, thus making it possible to reliably broaden the frequency band of the ultrasonic wave U1.

(5) For example, if the grooves K1 formed on the rear surface 52 of the piezoelectric element 43 reach the front surface 51 of the piezoelectric element 43, then the piezoelectric element 43 is completely divided by the plurality of vibration units 90, and the front-side electrode 54 formed on the front surface 51 of the piezoelectric element 43 is also unwillingly divided. Therefore, even if the first-lead wire 62 is connected to the front-side electrode 54 (side terminal), there is the problem that continuity cannot be achieved with the entire front-side electrode 54. On the other hand, according to the embodiment of this invention, since the vibration units 90 are connected to one another at the end-portion of the front surface 51 of the piezoelectric element 43, the front-side electrode 54 formed on the front surface 51 is not divided. In this case, if the first-lead wire 62 is connected to the front electrode 54, the sonar device 11 can be easily manufactured, since continuity with the entire front-side electrode 54 can be achieved. Also, since the vibration units 90 are connected to one another at the end-portion on the front surface 51 of the piezoelectric element 43, the entire front surface 51 of the piezoelectric element 43 comes into contact with the surface 42a of the base material 42. Therefore, the contact area between the two is secured, and the joining-strength between the piezoelectric element 43 and the base material 42 is improved. As a result, the reliability of the ultrasonic transducer 41 becomes even higher.

Also, the embodiment of this invention can be modified as follows.

Figure 13:
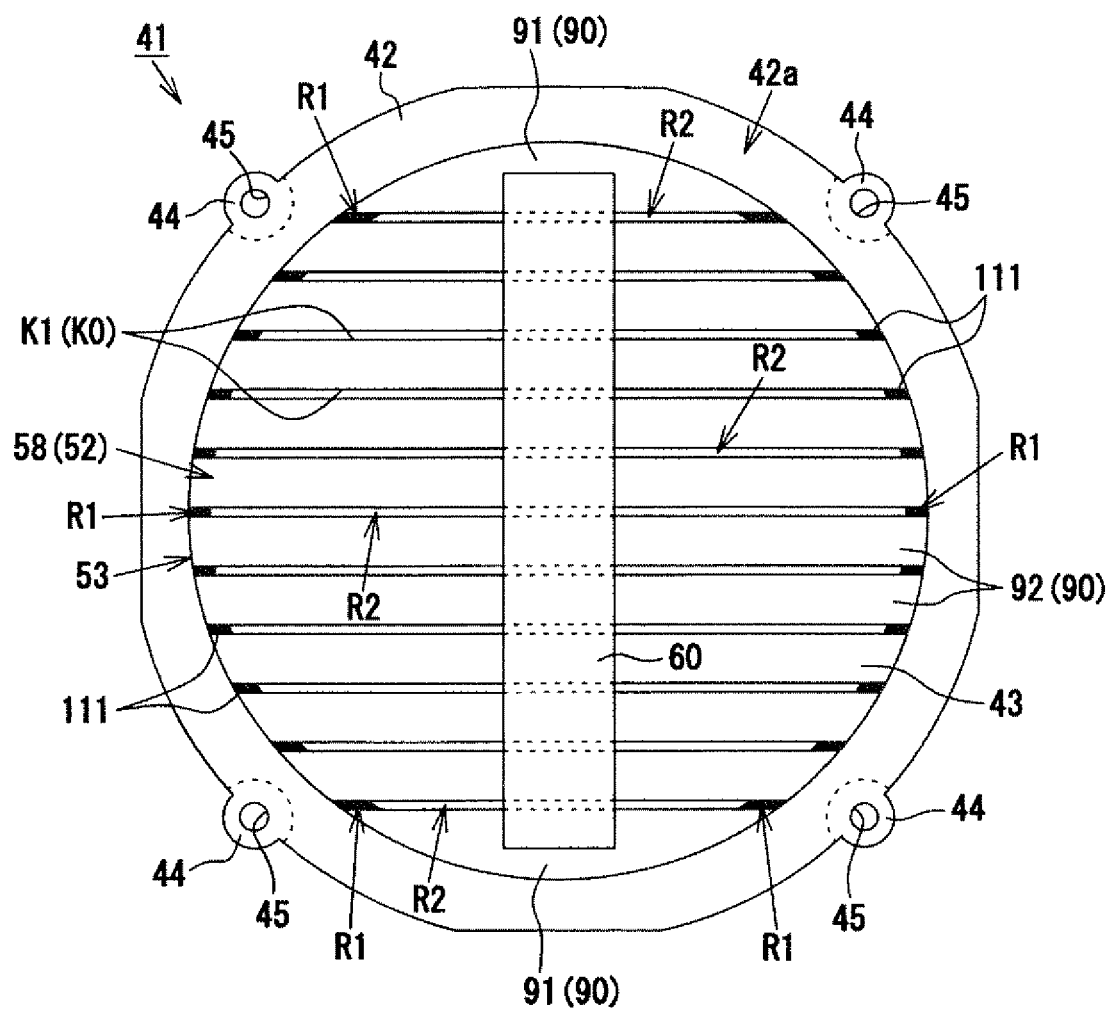
FIG. 13 is a plan-view of an ultrasonic transducer in another embodiment.
Figure 14:
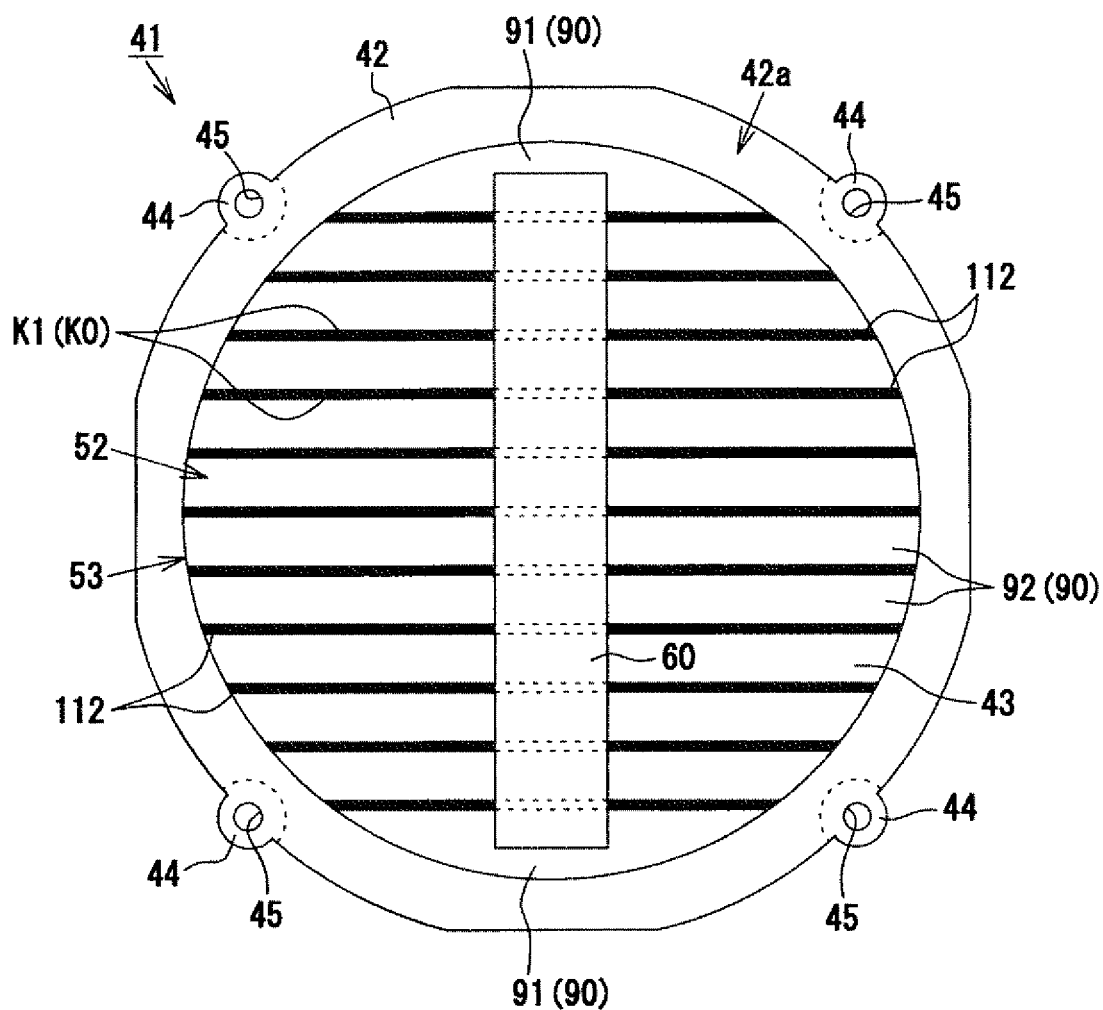
FIG. 14 is a plan-view of an ultrasonic transducer in yet another embodiment.
Figure 15:
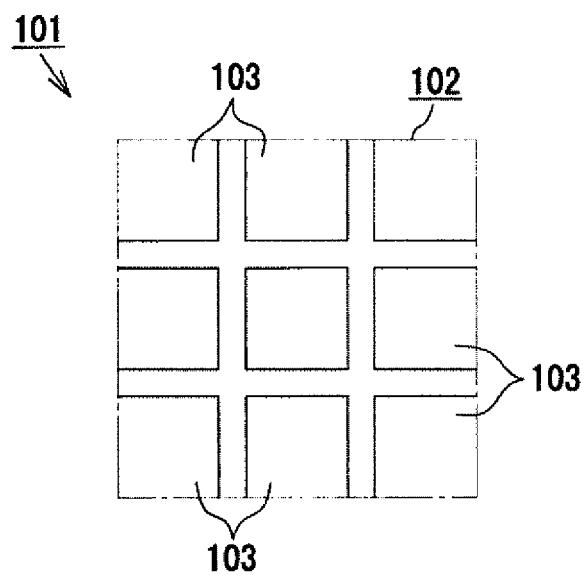
FIG. 15 is a plan-view of the main part of a piezoelectric element in the prior art.
Figure 16:
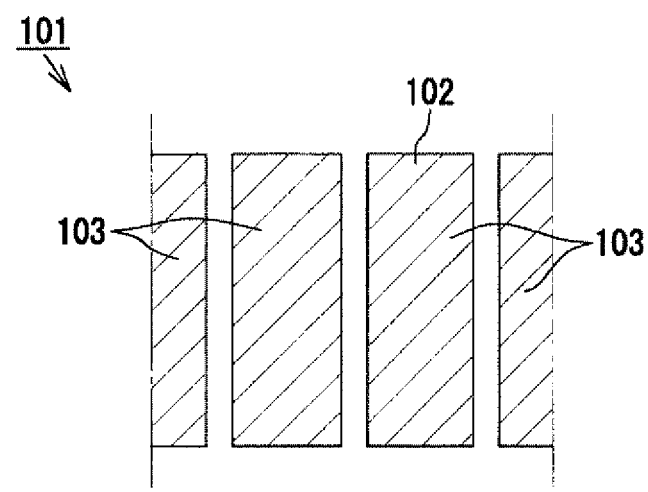
FIG. 16 is a cross-sectional view of a vibration unit in the prior art.

According to the ultrasonic transducer 41 as the above embodiment of this invention, the grooves K1 are void spaces K0 as a whole. However, a filler may be poured into a part of each groove K1. For example, as shown in FIG. 13, of each groove K1, the internal region of each groove K1 may be composed of a filling region R1 in which the filler 111 is poured, and composed of a non-filling region R2 in which the filler 111 is not poured. Also, as shown in FIG. 13, the filling region R1 is set at both ends of each groove K1, and the non-filling region R2 is set at the portion other than both ends of each groove K1. However, the positions of the filling regions R1 and non-filling regions R2 are not particularly limited and are, accordingly, changeable. Further, although the volume of the non-filling regions R2 is greater than the volume of the filling regions R1, it may be less than the volume of the filling regions R1 or equal to the volume of the filling regions R1. Furthermore, as shown in FIG. 14, the filler 112 may be poured into the entire internal region of each groove K1.

Also, if the characteristic-acoustic impedance of the fillers 111 and 112 is one tenth or more of the characteristic-acoustic impedance of the piezoelectric element 43, then the difference in the characteristic-acoustic impedance becomes less, and the ultrasonic wave U1 is less likely to be attenuated, thus making it possible to transmit and receive the ultrasonic wave U1 by using the radial vibration of the piezoelectric element 43. However, if the characteristic-acoustic impedance of the fillers 111 and 112 becomes higher, the density of the fillers 111 and 112 generally increases, and the fillers 111 and 112 become heavier. In that case, there is the problem that the vibrations of the vibration units 90 are hindered due to the presence of the fillers 111 and 112, thus decreasing the transmission/reception sensitivity. Therefore, to solve this problem, for example, it is preferable to set the specific gravity of the fillers 111 and 112 to 1.5 or less. As such, since the fillers 111 and 112 are relatively lighter, the fillers 111 and 112 are less likely to be loaded with the vibrations of the vibration units 90. As a result, it is possible to prevent a decrease in transmission/reception sensitivity caused by the fillers 111 and 112. It is also possible to prevent a decrease in transmission/reception sensitivity by lowering the characteristic-acoustic impedance of the fillers 111 and 112. In this case, however, the radial vibration of the piezoelectric element 43 becomes weak. Thus, it is preferable to reduce the specific gravity of the fillers 111 and 112.

According to the above embodiment of this invention, the width W1 of the outer-vibration units 91 and the width W2 of the inner-vibration units 92 are different from each other. However, the widths W1 and W2 may be equal to each other. In addition, according to the above embodiment of this invention, the widths of the grooves K1 formed on the piezoelectric element 43 are equal to one another. However, the widths of the grooves K1 may be different from one another.

According to the ultrasonic transducer 41 as the above embodiment of this invention, the piezoelectric element 43 made of lead-zirconate titanate (PZT) is used. However, the material for forming the piezoelectric element 43 is not particularly limited. It is also possible, for example, to use a piezoelectric element made of the piezoelectric ceramics of potassium-niobate sodium (alkaline niobate), of barium titanate, of PMN-PT(Pb($Mg_{1/3}Nb_{2/3}$)$O_3$—$PbTiO_3$) single crystal, of PZNT (Pb($Zn_{1/3}Nb_{2/3}$)$O_3$—$PbTiO_3$) single crystal or of $LiNbO_3$ single crystal.

According to the ultrasonic transducer 41 as the above embodiment of this invention, the base material 42 made of glass epoxy (FR-4) is used. However, the material for forming the base material 42 can be changed appropriately in consideration of the characteristic acoustic impedance, of the frequency of the ultrasonic wave U1, or of the mechanical strength or the like. It is also possible, for example, to use a base material composed of a porous body of glass epoxy (CEM-3), of polyphenyl sulfide (PPS), of Duratron® (the registered trademark of Quadrant Group), of Fluorosint® (the registered trademark of Quadrant Group), and of alumina-porous body.

According to the above embodiment of this invention, the driving modes of the ultrasonic transducer 41 are switchable, either the full-drive mode (first mode) to drive all of the vibration units 90, or the partial-drive mode (second mode) to drive the vibration unit 90 that is located nearest from the center O1 of the piezoelectric element 43 among each vibration unit 90.

The ultrasonic transducer 41 of the above embodiment is used for the sonar device 11, which mechanically changes the irradiation direction of the ultrasonic wave U1. However, it may also be used for other measuring devices. For example, the ultrasonic transducer may be used as a sonar device that electrically changes the irradiation direction of the ultrasonic wave U1. Further, the ultrasonic transducer may be used for a fish finder that does not change the irradiation direction of the ultrasonic wave U1, that is, does not have the drive mechanism 30. Furthermore, the ultrasonic transducer may be used for a measuring device such as a sounding device for measuring the depth of water or as an aerial sensor for measuring distance in the air.

Besides the technical ideas of this invention, as described above, other technical ideas to be understood are described hereinafter.

(1) An ultrasonic transducer for a measuring device, according to the second or third aspect of this invention, characterized in that the maximum value of the width of the vibration unit is less than the depth of the grooves, and that the depth of the grooves is less than the thickness of the piezoelectric element.

(2) An ultrasonic transducer for a measuring device, according to the seventh aspect of this invention, characterized in that the volume of the non-filling region is greater than the volume of the filling region.

(3) An ultrasonic transducer for a measuring device, according to any one of the first to ninth aspects of this invention, characterized in that the difference between the peak of the transmission/reception sensitivity of the first-frequency band and the peak of the transmission/reception sensitivity of the second-frequency band is 5 dB or more and 10 dB or less.

(4) An ultrasonic transducer for a measuring device, according to any one of the first to ninth aspects of this invention, characterized in that the second-frequency band indicates a frequency range within 6 dB or less than the peak of the transmission/reception sensitivity.

(5) An ultrasonic transducer for a measuring device, according to any one of the first to ninth aspects of this invention, characterized in that the transmission/reception sensitivity of the second frequency band is −45 dB or more within a specific range in which the frequency width is 40 kHz or less.

(6) An ultrasonic transducer for a measuring device, according to any one of the first to ninth aspects of this invention, characterized in that when the maximum value of the width of the vibration unit is represented as W, and the minimum value of the outer diameter of the piezoelectric element is represented as L, the relationship of W/L≤0.1 is satisfied.

(7) An ultrasonic transducer for a measuring device, according to any one of the first to ninth aspects of this invention, characterized in that the plurality of the vibration units are composed of a pair of outer-vibration units and of a plurality of inner-vibration units located between the pair of outer-vibration units, therein the width of the outer-vibration unit is greater than the width of the inner-vibration unit.

(8) An ultrasonic transducer for a measuring device, according to any one of the first to ninth aspects of this invention, characterized in that the drive mode of the ultrasonic transducer can be switched either to the first mode of driving all of the vibration units or to the second mode of driving the vibration unit located on the place where the distance from the center of the piezoelectric element is nearest among the plurality of vibration units.

DESCRIPTION OF THE REFERENCE NUMERALS

11: Sonar device as the measuring device
41: Ultrasonic transducer
42: Base material
43: Piezoelectric element
51: Front surface of the piezoelectric element
52: Rear surface of the piezoelectric element
90: Vibration unit
91: Outer-vibration unit as the vibration unit
92: Inner-vibration unit as the vibration unit
111, 112: Filler
113: Thickness of the piezoelectric element
K0: Void space
K1: Groove(s)
O1: Center of the piezoelectric element
R1: Filling region R2: Non-filling region
U1: Ultrasonic wave
W: Maximum value of the width of the vibration unit

The invention claimed is:

1. An ultrasonic transducer for a measuring device, which transmits and receives ultrasonic waves, characterized in that the ultrasonic transducer includes a substantially disc-shaped base material that serves also as an acoustic-matching layer and includes a substantially disc-shaped piezoelectric element having a front-surface joined to the base material and having a rear-surface on the opposite side thereof, wherein an area of the base material is greater than an area of the piezoelectric element, and the piezoelectric element is formed with a plurality of strip-shaped vibration units arranged through grooves extending in a planar direction, the grooves not crossing one another, wherein a farther a distance from a center of the piezoelectric element is, a shorter a length of the strip-shaped vibration unit is, and the plurality of the strip-shaped vibration units are connected to one another at an end of the front-surface of the piezoelectric element, with the piezoelectric element vibrating in a thickness direction in a first-frequency band and vibrating also in a radial direction in a second-frequency band, which is lower than the first-frequency band.

2. The ultrasonic transducer for a measuring device, which transmits and receives ultrasonic waves according to claim 1, characterized in that a maximum value of a width of the strip-shaped vibration unit is less than a thickness of the piezoelectric element, and that the thickness of the piezoelectric element is less than an outer diameter of the piezoelectric element.

3. The ultrasonic transducer for a measuring device, which transmits and receives ultrasonic waves according to claim 2, characterized in that the maximum value of the width of the vibration unit is one fourth or more and half or less of the thickness of the piezoelectric element.

4. The ultrasonic transducer for a measuring device, which transmits and receives ultrasonic waves according to claim 1, characterized in that an outer diameter of the piezoelectric element is more than twice a thickness of the piezoelectric element.

5. The ultrasonic transducer for a measuring device, which transmits and receives ultrasonic waves according to claim 1, characterized in that a depth of the grooves is 80% or more and less than 100% of a thickness of the piezoelectric element.

6. The ultrasonic transducer for a measuring device, which transmits and receives ultrasonic waves according to claim 1, characterized in that the grooves are entirely a void space.

7. The ultrasonic transducer for a measuring device, which transmits and receives ultrasonic waves according to claim 1, characterized in that an internal region of the grooves is made of a filling region filled with a filler and made of a non-filling region not filled with a filler.

8. The ultrasonic transducer for a measuring device, which transmits and receives ultrasonic waves according to claim 1, characterized in that a whole internal region of the grooves is filled with a filler.

9. An ultrasonic transducer for a measuring device, which transmits and receives ultrasonic waves according to claim 7, characterized in that a characteristic-acoustic impedance of the filler is one tenth or more of a characteristic-acoustic impedance of the piezoelectric element, and that a specific gravity of the filler is 1.5 or less.

* * * * *